(12) United States Patent
Baek et al.

(10) Patent No.: US 9,891,407 B2
(45) Date of Patent: Feb. 13, 2018

(54) LENS DRIVING MODULE

(71) Applicant: Samsung Electronics Co., Ltd., Suwon-si, Gyeonggi-do (KR)

(72) Inventors: Jong-ho Baek, Suwon-si (KR); Byung-jin Yoo, Cheongju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/010,475

(22) Filed: Jan. 29, 2016

(65) Prior Publication Data

US 2016/0223780 A1  Aug. 4, 2016

(30) Foreign Application Priority Data

Feb. 4, 2015  (KR) .................. 10-2015-0017471

(51) Int. Cl.
*G02B 7/10* (2006.01)
*G03B 3/10* (2006.01)
*H02K 37/12* (2006.01)
*G02B 7/09* (2006.01)
*G03B 5/00* (2006.01)

(52) U.S. Cl.
CPC ............ *G02B 7/10* (2013.01); *G02B 7/09* (2013.01); *G03B 3/10* (2013.01); *G03B 5/00* (2013.01); *H02K 37/12* (2013.01); *G03B 2205/0046* (2013.01); *G03B 2205/0069* (2013.01)

(58) Field of Classification Search
CPC ... G02B 7/02; G02B 7/04; G02B 7/08; G02B 7/09; G02B 7/10; G02B 7/102; G02B 13/001; G02B 27/646; G03B 5/00; G03B 3/02; G03B 3/10; G03B 2205/0046; G03B 2205/0053; G03B 2205/0069; H02K 21/44; H02K 37/12; H02K 37/14
USPC .............. 359/814, 823, 824, 819, 696, 697; 396/133, 144, 508; 310/12.16, 12.24, 310/112, 49.07
See application file for complete search history.

(56) References Cited

U.S. PATENT DOCUMENTS

| 4,676,605 | A | * | 6/1987 | Toda ................... G02B 7/04 359/696 |
| 4,750,821 | A | * | 6/1988 | Yamamoto ............. G02B 7/10 250/201.7 |
| 4,758,756 | A |   | 7/1988 | Pouillange |
| 5,184,245 | A | * | 2/1993 | Murakami .......... G02B 7/1821 310/90 |
| 6,375,358 | B1 | * | 4/2002 | Maekawa ............ F16C 17/026 359/200.1 |

(Continued)

FOREIGN PATENT DOCUMENTS

JP    2007-093998 A    4/2007

*Primary Examiner* — Loha Ben
(74) *Attorney, Agent, or Firm* — Jefferson IP Law, LLP

(57) ABSTRACT

A lens driving module for driving a lens along an optical axis is provided. The lens driving module includes a stator having a hollow cylindrical shape through which the optical axis passes through and including coils, a rotator having a hollow shape through which the optical axis passes, mounted on an outer side of the stator, capable of rotating with respect to the stator with the optical axis as a center line, and including magnets facing the coils, and at least one of rotation connecting members connecting the rotator to the stator such that the rotator may rotate with respect to the stator to maintain a gap between the coils and the magnets.

20 Claims, 24 Drawing Sheets

(56) References Cited

U.S. PATENT DOCUMENTS

| | | | |
|---|---|---|---|
| 6,731,027 B2 | 5/2004 | Ohnishi et al. | |
| 7,061,700 B2 * | 6/2006 | Honsho | G02B 7/08 |
| | | | 359/696 |
| 7,064,468 B2 | 6/2006 | Fujinaka | |
| 7,064,912 B2 * | 6/2006 | Yamamoto | G02B 7/021 |
| | | | 359/696 |
| 7,122,920 B2 * | 10/2006 | Mizumaki | H02K 1/145 |
| | | | 310/185 |
| 7,146,097 B2 * | 12/2006 | Kameyama | G02B 7/08 |
| | | | 359/824 |
| 7,359,631 B2 * | 4/2008 | Naka | G02B 7/102 |
| | | | 348/345 |
| 7,414,801 B2 * | 8/2008 | Honsho | G02B 7/102 |
| | | | 359/811 |
| 7,923,887 B2 | 4/2011 | Nakagawa | |
| 7,995,287 B2 | 8/2011 | Naitou | |
| 8,084,899 B2 * | 12/2011 | Yasuda | H02K 21/44 |
| | | | 310/181 |
| 2016/0216528 A1 * | 7/2016 | Asakawa | G02B 27/646 |

* cited by examiner

LENS DRIVING MODULE

CROSS-REFERENCE TO RELATED APPLICATION(S)

This application claims the benefit under 35 U.S.C. § 119(a) of a Korean patent application filed on Feb. 4, 2015 in the Korean Intellectual Property Office and assigned Serial number 10-2015-0017471, the entire disclosure of which is hereby incorporated by reference.

TECHNICAL FIELD

The present disclosure relates to a lens driving module for driving a lens of a photographing apparatus or a structure including a lens mounted thereon.

BACKGROUND

Recently, demand for photographing still images and moving images via photographing apparatuses have increased. In addition, demand for photographing apparatuses with high pixel density and high optical magnification have increased. Accordingly, a weight of a lens in a photographing apparatus and a weight of a structure having a lens mounted thereon have increased.

A step motor may be used to move a lens in a photographing apparatus along an optical axis. However, when the step motor is used, securing a large rotational force may not be easy due to the actuation of the step motor. Thus, when the step motor is used, a reduction structure, which includes a gear train, is used to increase the rotational force by reducing the high number of revolutions of the step motor. The gear train includes a plurality of gears engaged with each other.

However, vibration and noise may occur in such a reduction structure due to the impact between gears and deformations of the gear teeth due to a twisting moment generated along a rotational axis of each gear. In addition, the vibration and noise may increase when the lens driving source is driven at high speed, and such vibrations and noise may result in a loss of the driving force and cause mechanical defects accompanied by generation of filings and heat.

Such vibration, noise, and subsequent mechanical defects may directly affect the performance of the photographing apparatus. Especially, these factors may be more critical when photographing moving images with the photographing apparatus.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a lens driving module which may reduce vibration, noise, and mechanical defects while driving the lens, by making a rotator rotate with respect to a stator via an interaction between a magnet and a coil.

Another aspect of the present disclosure is to provide a lens driving module including a rotator of which a rotation axis may not move with respect to an optical axis when the rotator rotates with respect to a stator.

In accordance with an aspect of the present disclosure, a lens driving module for driving a lens along an optical axis is provided. The lens driving module includes a stator having a hollow cylindrical shape through which the optical axis passes and including coils, a rotator having a hollow cylindrical shape through which the optical axis passes, placed on an outer side of the stator, capable of rotating with respect to the stator with the optical axis as a center line, and including a plurality of magnets facing the coils, and at least one rotation connecting unit connecting the rotator to the stator such that the rotator may rotate with respect to the stator to maintain a gap between the coils and the magnets.

The rotator may further include a driving force transfer unit configured to transfer a driving force to a barrel on an outer side of the rotator.

The coils may be arranged on an outer peripheral surface along a circumferential direction, and the magnets may be arranged on an inner peripheral surface along the circumferential direction.

The coils and the magnets may be spaced apart from each other in a direction perpendicular to the optical axis.

The coils may be fixed to the stator through bonding.

A detection sensor detecting an angle of rotation of the stator may be arranged inside the coil.

The rotation connecting unit may include an inner supporting unit fixed to the stator, an outer supporting unit fixed to the rotator, and rotation members arranged between the inner supporting unit and the outer supporting unit.

In accordance with another aspect of the present disclosure, a lens driving module for driving the lens along an optical axis is provided. The lens driving module includes a stator having a hollow cylindrical shape through which the optical axis passes and including coils, a rotator having a hollow shape through which the optical axis passes, placed outside the stator, capable of rotating with respect to the stator with the optical axis as a center line, spaced apart from the stator along the optical axis and including magnets facing the coils, a rotation connecting member connecting the rotator to the stator such that a gap is maintained between the rotator and the stator along the optical axis, and a gap maintaining unit to maintain a gap between the rotator and the stator in a direction perpendicular to the optical axis.

The lens driving module may further include a base on an inner side of the stator and the rotator for fixing and supporting the stator.

The gap maintaining unit may include a first movement limiting unit arranged on the stator to limit a movement of the rotation connecting unit in a direction perpendicular to the optical axis and a second movement limiting unit arranged on the rotator to limit a movement of the rotation connecting unit in a direction perpendicular to the optical axis.

The gap maintaining unit may include a movement limiting member between the base and the rotator.

The stator may include teeth and the coils are wound on the teeth.

The stator may include a contact member contacting the rotation connecting member and a coil supporting member supporting the coil, and the rotator may include a contact member contacting the rotation connecting member and a magnet supporting member supporting the magnet.

A material of the contact member of the stator and the contact member of the rotator may be different from that of the coil supporting member and the magnet supporting member.

The contact member of the stator and the coil supporting member may be combined in a tight-fit manner.

The coils and the magnets may be spaced apart from each other along the optical axis.

The coils and the magnets may be spaced apart from each other in a direction perpendicular to the optical axis.

The rotator may further include an inner insertion unit extending in a direction parallel with the optical axis and inserted into the inside of the stator, and the gap maintaining unit may include a movement limiting member arranged between the inner insertion unit and the stator.

The base may include a body unit extending in a direction parallel with the optical axis and a wing unit extending from the body unit in a direction perpendicular to the optical axis, and an additional magnet providing a magnetic force to the rotator in a direction in which a gap between the coil and the magnet increases may be arranged on the wing unit.

The gap maintaining unit may include movement limiting members between the rotator and the body, and between the rotator and the wing unit.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While such terms as "first," "second," etc., may be used to describe various components, such components must not be limited to the above terms. The above terms are used only to distinguish one component from another. For example, without departing from the scope of the present disclosure, a first component may be named as a second component, and similarly, the second component may be named as the first component.

It will be further understood that the terms "comprises" and/or "comprising" used herein specify the presence of stated features or components, but do not preclude the presence or addition of one or more other features or components.

Figure 1:
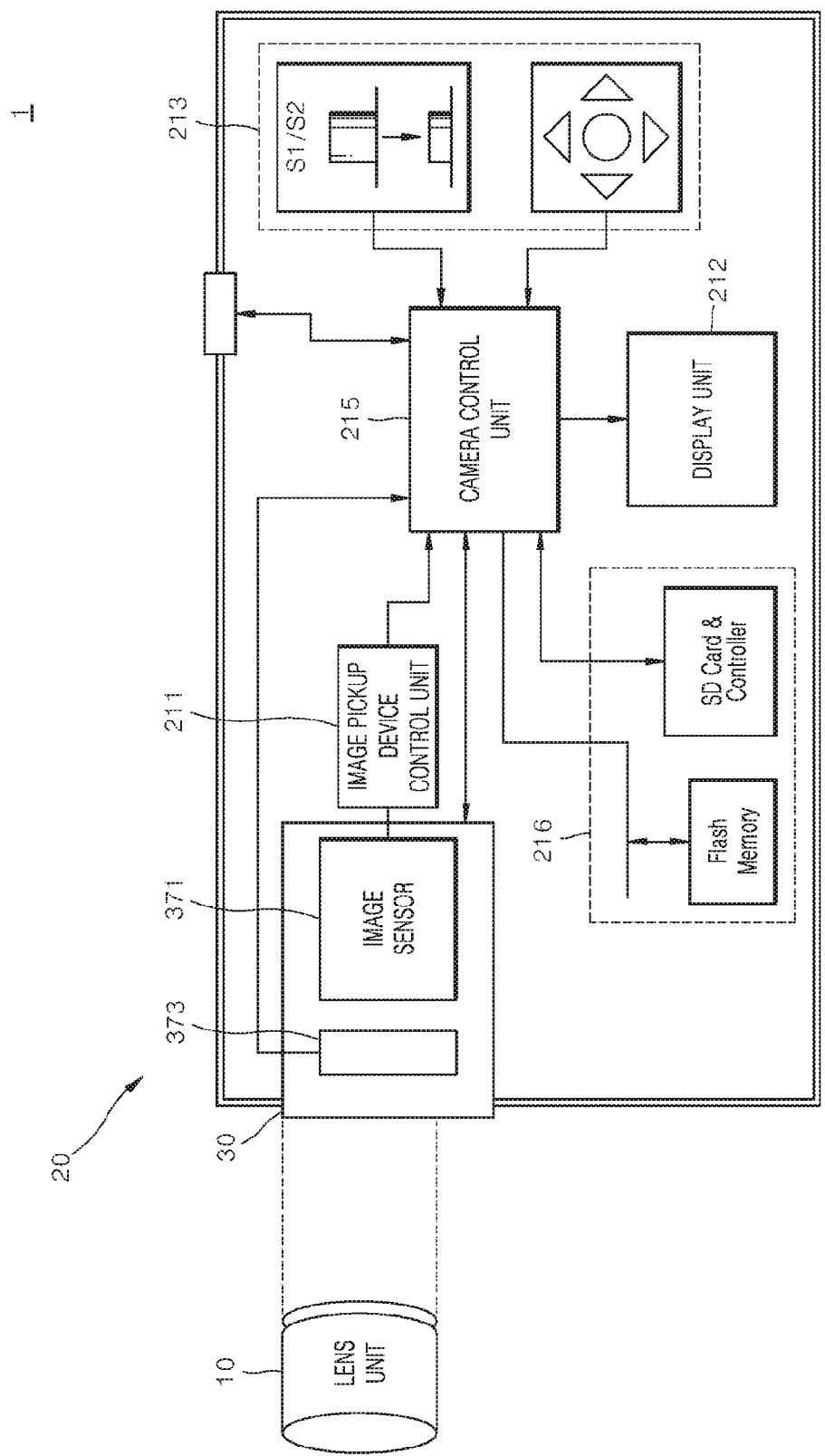
FIG. 1 is a block diagram of a photographing apparatus according to an embodiment of the present disclosure.
Figure 2:
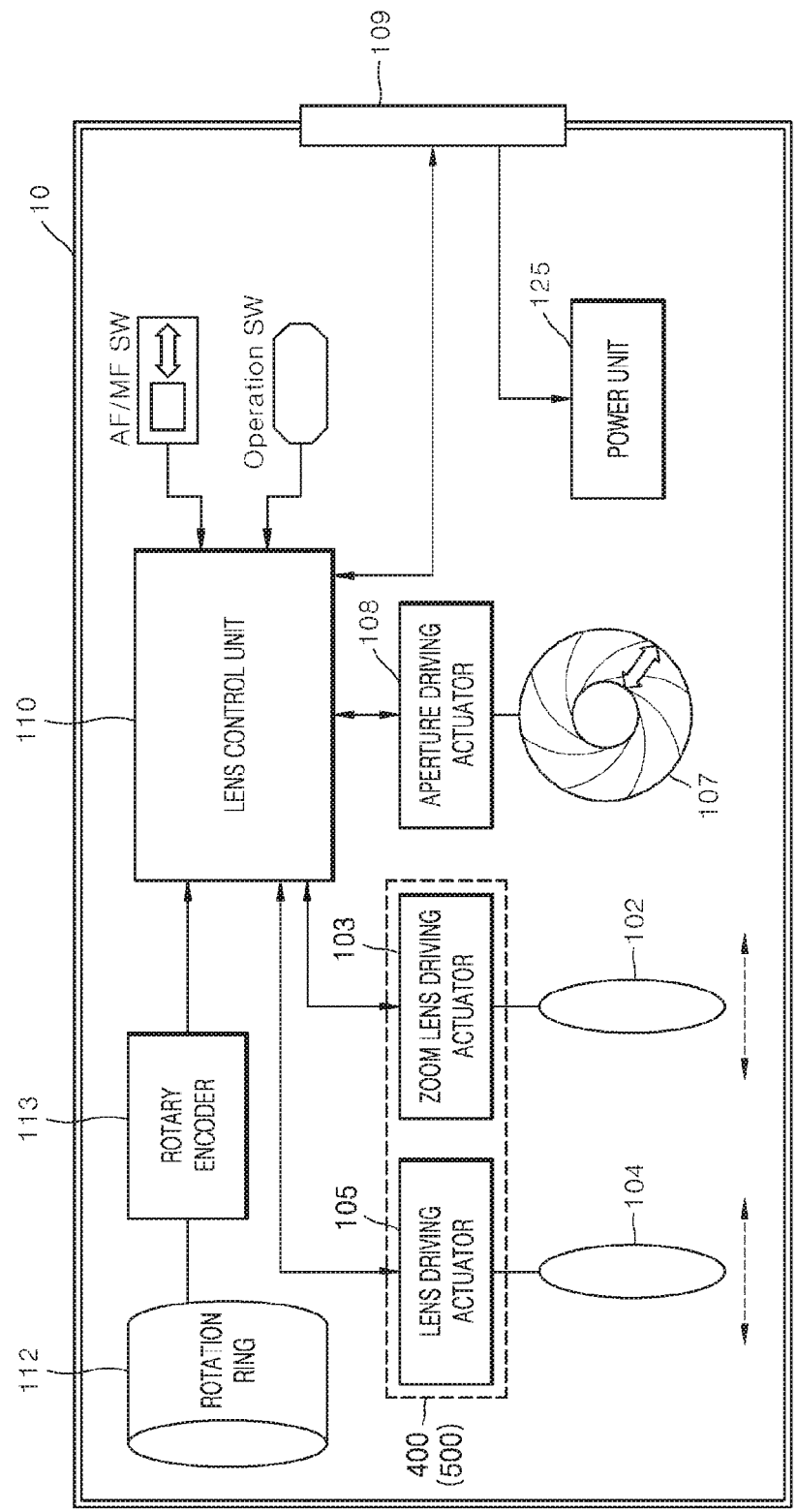
FIG. 2 is a block diagram of a lens unit according to an embodiment of the present disclosure.

FIG. 1 is a block diagram of a photographing apparatus according to an embodiment of the present disclosure, and FIG. 2 is a block diagram of a lens unit according to an embodiment of the present disclosure.

Referring to FIGS. 1 and 2, a photographing apparatus 1 may include a lens unit 10 and a body unit 20 according to various embodiments.

The lens unit 10 may detect focus and the body unit 20 may drive a focus lens 104 of the lens unit 10. When manual focus control is used, a zoom lens 102 and the focus lens 104 may be driven by a user's control.

The lens unit 10 may include the zoom lens 102, the focus lens 104 and an aperture 107 which changes a focus location, a lens driving actuator 105, a rotary encoder 113, an aperture driving actuator 108, a lens control unit 110, and a lens mount 109. In addition, each of the zoom lens 102 and the focus lens 104 may include a plurality of lenses.

A zoom lens driving actuator 103, the lens driving actuator 105, and the aperture driving actuator 108 may be driven by the lens control unit 110 and may respectively drive the zoom lens 102, the focus lens 104, and the aperture 107. For example, the zoom lens driving actuator 103 may adjust a zoom by moving the zoom lens 102 along an optical axis. The lens driving actuator 105 may adjust a focus by moving the focus lens 104 along the optical axis. Thus, the zoom lens driving actuator 103 and the lens driving actuator 105 which respectively move the zoom lens 102 and the focus lens 104 may be respectively referred as lens driving modules 400 and 500.

The focus lens 104 may be manually controlled by a user. The rotary encoder 113 may detect a location of the focus lens 104 in accordance with the user's manual control. For example, the user may manually control a rotation ring 112 to move the location of the focus lens 104, and the rotary encoder 113 may detect a rotational status of the rotation ring 112 to calculate the location of the focus lens 104.

Next, after the lens control unit 110 has calculated the location of the focus lens 104, the lens control unit 110 may transmit information about the calculated location of the focus lens 104 to the body unit 20. The lens control unit 110 may transmit information about the detected location of the focus lens 104 when a change in the location of the focus lens 104 may occur or when a camera control unit 215 may request location information of the focus lens 104. In addition, the lens control unit 110 may continuously calculate information about the rotational status of the lens unit 10 via a method used in manual focus control.

A power unit 125 may provide power transmitted from the body unit 20 to the lens control unit 110 and actuators 103, 105, and 108.

In the various embodiments described above, controlling of the lens unit 10 is performed in the lens control unit 110. However, the present disclosure is not limited thereto. One with an ordinary skill in the art would easily understand that controlling of the lens unit 10 may be performed in the camera control unit 215 as described below or the lens control unit 110 and the camera control unit 215 may be configured into one control unit.

The lens mount 109 may have contacts that are used to transmit and receive signals such as power, data, control signals, etc.

The body unit 20 may include a lens mounting module 30, an image pickup device control unit 211, a display unit 212, an operation key 213, and the camera control unit 215 according to various embodiments.

The lens mounting module 30 is a component on which the lens unit 10 is arranged and may be in an electrical contact with the contact area of the lens unit 10 (not shown). The lens mounting module 30 may include an image sensor 371 and a shutter 373.

The image sensor 371 may generate an image signal by receiving light which passed through an imaging optical system of the lens unit 10. The image sensor 371 may include a plurality of photoelectric conversion units arranged in a matrix shape and may include vertical and/or horizontal transmission paths along which electric charge may move from the photoelectric conversion unit based on start reading image signals, etc. A charge coupled device (CCD) sensor, a complementary metal oxide semiconductor (CMOS) sensor, etc. may be used as the image sensor 371.

The shutter 373 may determine an exposure time (i.e., a time when light is applied to the image sensor 371).

The image pickup device control unit 211 may generate a timing signal and control imaging of the image sensor 371 in synchronization with the timing signal. In addition, the image pickup device control unit 211 may control image signals in a horizontal direction to be sequentially read after completion of a charge accumulation on each scanning line is over, and the read image signals in the horizontal direction may be used for focus detection in the camera control unit 215.

The display unit 212 may display various images and information. An organic light emitting diode (OLED), etc. may be used for the display unit 212. Also, a liquid crystal display (LCD) may be used. In addition, a touch panel may be arranged on a surface cover of the display unit 212 and touching locations may be input while the user looks at images displayed on the display unit 212.

The operation key 213 may receive various commands from the user for controlling the photographing apparatus 1. The operation key 213 may include various buttons such as a shutter-release button, a main switch, a mode dial, and a menu button.

The camera control unit 215 may perform focus detection for image signals generated by the image sensor 371 and calculate focus detection estimate values. In addition, the camera control unit 215 may save focus detection estimate values during focus detection in accordance with the timing signal generated in the image pickup device control unit 211 and may calculate a focus location using the saved focus detection estimate values. The focus detection estimate values may be stored in a storage unit 216 which can be implemented via a suitable storage device (e.g., a flash memory, a secure digital (SD) card and controller).

The lens mounting module 30 may transmit results of the focus location to the lens unit 10 via the contact area of the lens mount 109.

Figure 3A:
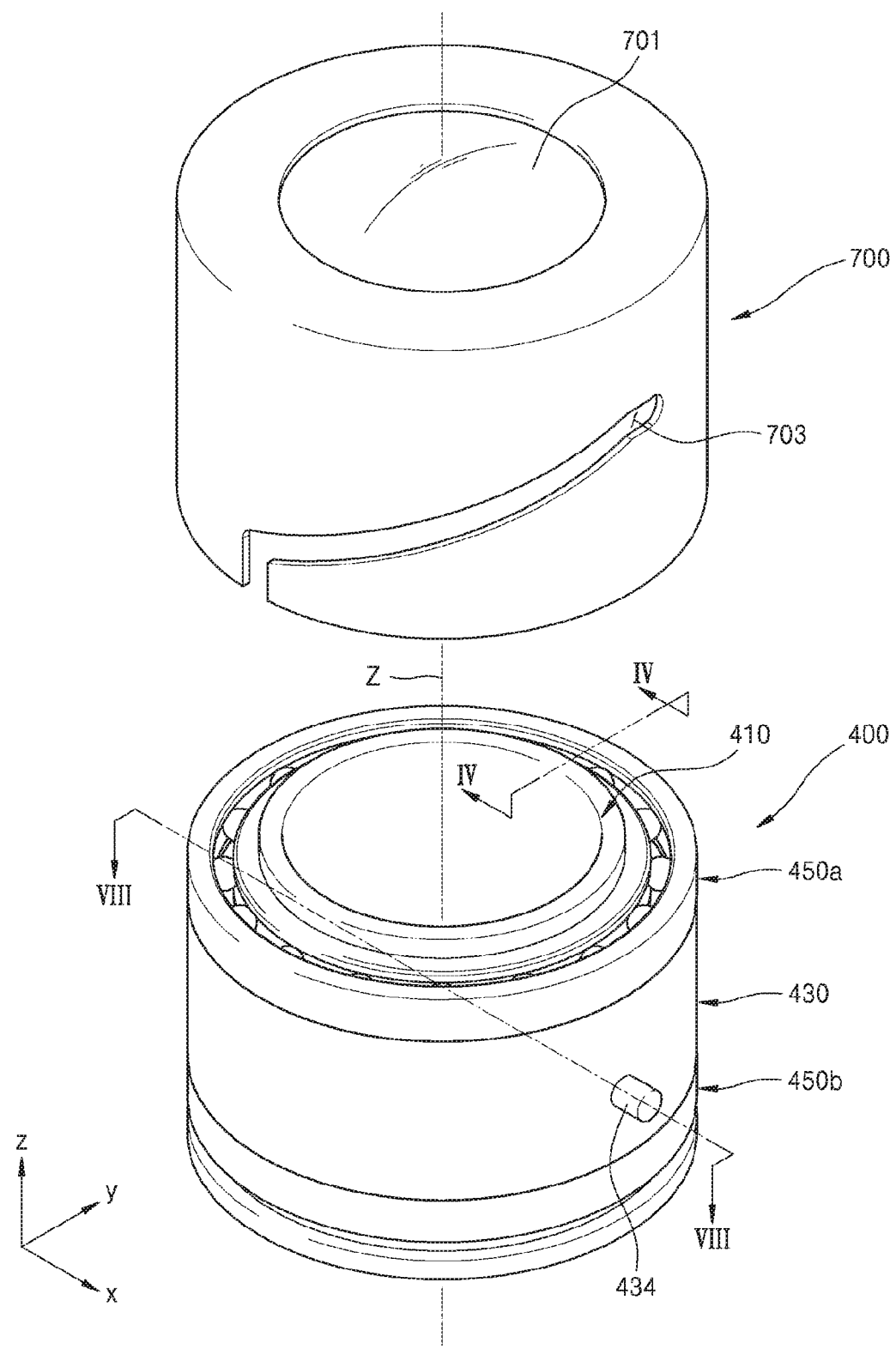
FIG. 3A illustrates a lens driving module of a lens unit according to various embodiments of the present disclosure.
Figure 3B:
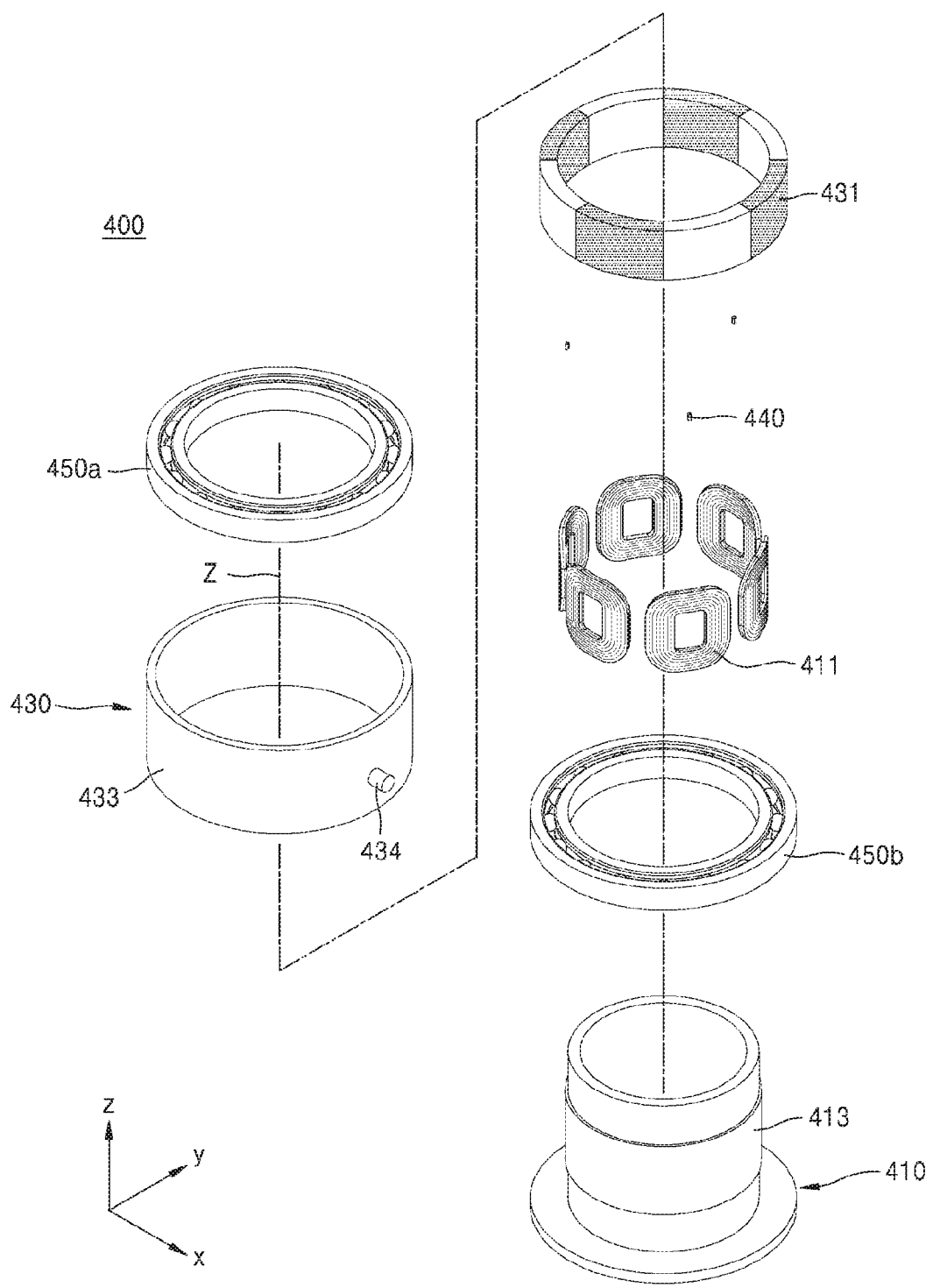
FIG. 3B is an exploded perspective view of a lens driving module according to an embodiment of the present disclosure.

FIG. 3A illustrates a lens driving module of a lens unit according to various embodiments of the present disclosure. FIG. 3B is an exploded perspective view of a lens driving module according to an embodiment of the present disclosure.

Referring to FIGS. 3A and 3B, a barrel 700 has a cylindrical shape along an optical axis Z and supports a lens driving module 400.

The barrel 700 may include a lens 701. The lens 701 may be the zoom lens or the focus lens. However, the barrel 700 is not limited to the lens barrel and may also be a cam barrel connecting the lens barrel supporting the lens 701 to the lens driving module 400.

The lens driving module 400 may include a stator 410 fixed to the lens unit 10 and a rotator 430 rotating with respect to the stator 410. Each of the stator 410 and the rotator 430 may have a hollow cylindrical shape through which the optical axis Z may pass. The rotator 430 may be arranged on an outer side of the stator 410.

Since both the stator 410 and the rotator 430 have a hollow cylindrical shape as described above, the lens driving module 400 and the barrel 700 may be arranged along the optical axis Z. Since the lens driving module 400 may be arranged with the barrel 700 along the optical axis Z, an increase in a radial direction of the lens unit 10 due to the lens driving module 400 may be prevented.

The rotator 430 of the lens driving module 400 may include a driving force transfer unit 434 for transferring a driving force to other members. For example, the driving force transfer unit 434 of the rotator 430 may have a protrusion shape extending in a direction perpendicular to the optical axis Z. The barrel 700 may include a guide unit 703 and the driving force transfer unit 434 may be inserted into the guide unit 703. The guide unit 703 is formed and extending in a direction intersecting a rotational direction of the rotator 430.

When the rotator 430 of the lens driving module 400 rotates with respect to the stator 410 when the driving force transfer unit 434 is inserted into the guide unit 703, the barrel 700 may be able to move along the optical axis Z. In this case, a movement of the barrel 700 along the optical axis Z may include not only a straight movement along the optical axis Z but also a straight movement along the optical axis Z and a rotation movement around the optical axis Z.

The driving force transfer unit 434 and the guide unit 703 may be shaped to have different configurations and may be the opposite each other. For example, the guide unit 703 of the barrel 700 may have a protrusion shape extending in a direction perpendicular to the optical axis Z toward the rotator 430, the guide unit 703 may be inserted in the driving force transfer unit 434, and the driving force transfer unit 434 may have a shape extending in the rotational direction of the rotator 430.

The lens driving module 400 may include a plurality of coils 411 arranged on an outer peripheral surface of the stator 410, a yoke 413 disposed on an outer peripheral surface of the stator 410, a rotator 430 rotatable with respect to the stator 410, a plurality of magnets 431, a detection sensor 440 for detecting a rotational angle of the rotator 430, and rotation connecting units 450*a* and 450*b* connecting the stator 410 to the rotator 430.

Figure 4:
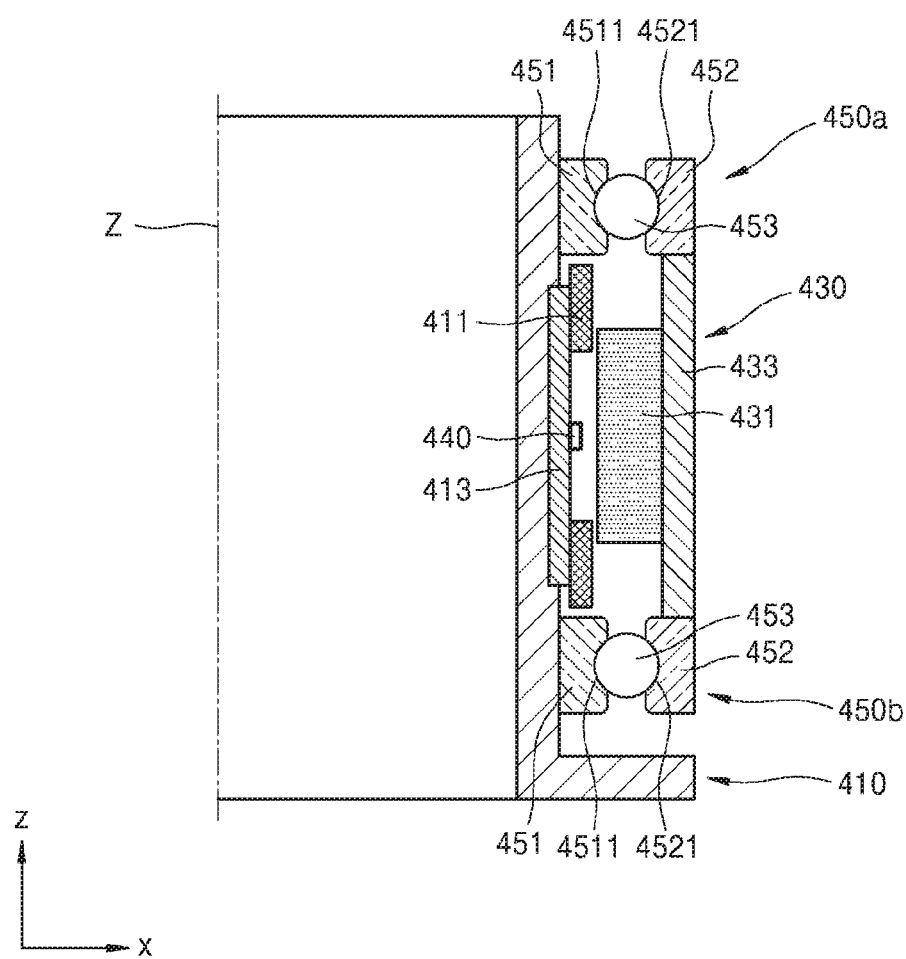
FIG. 4 is a cross-sectional view of the lens driving module of FIG. 3A cut along a line IV-IV according to an embodiment of the present disclosure.
Figure 5:
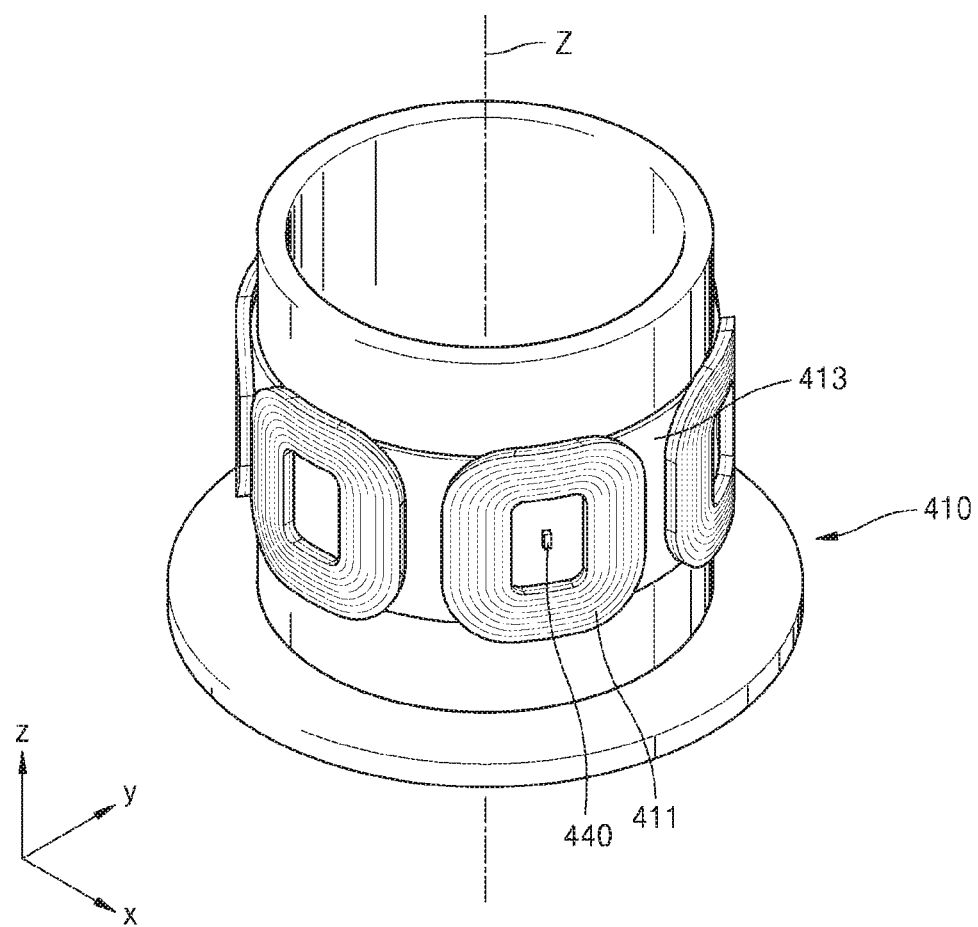
FIGS. 5 to 7 are enlarged perspective views of a stator, a rotator, and a rotation connecting unit of a lens driving module according to various embodiments of the present disclosure.
Figure 6:
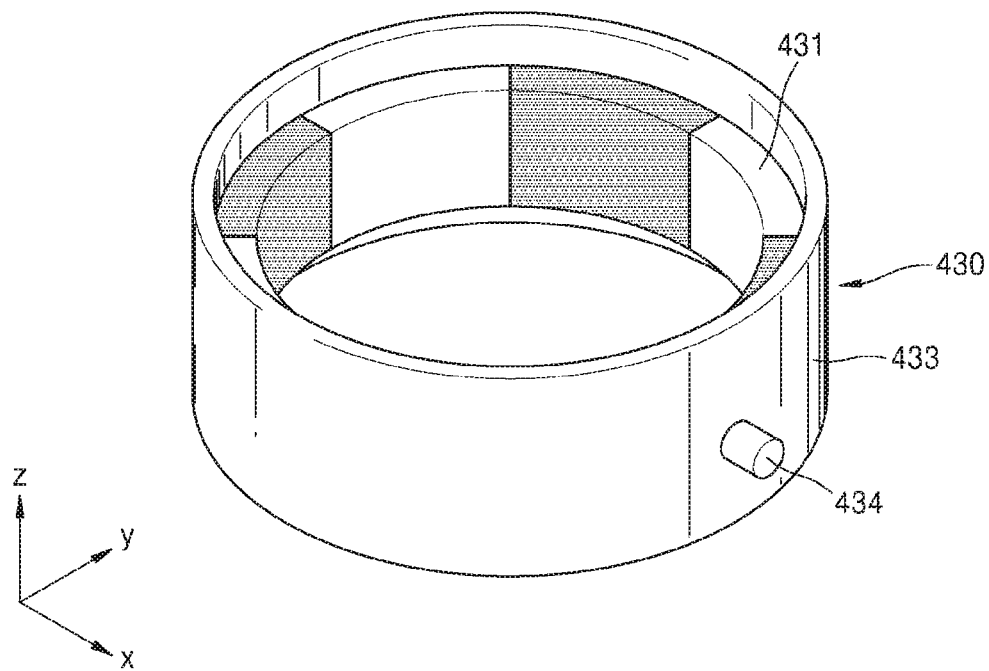
Figure 7:
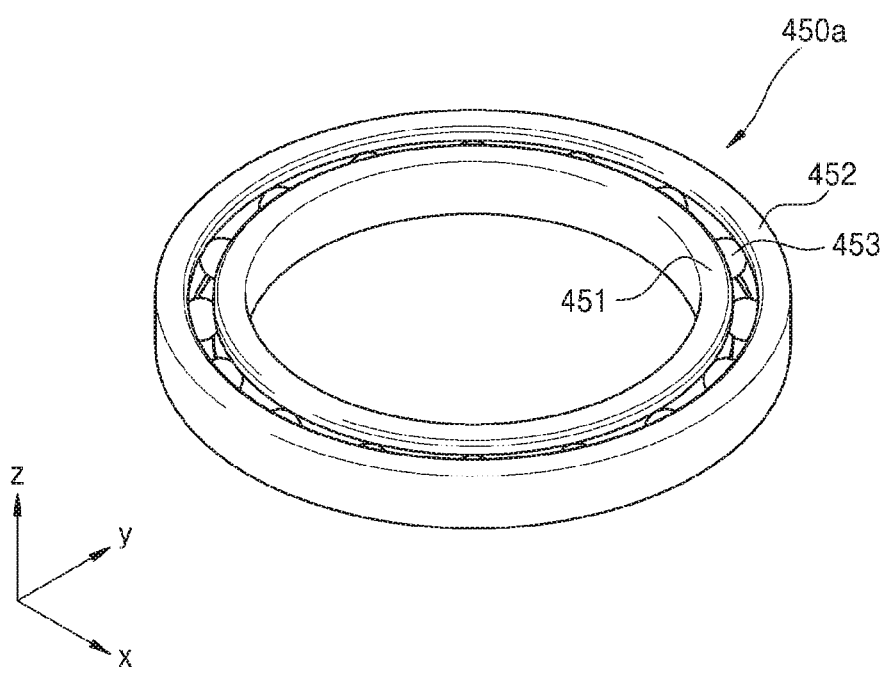

FIG. 4 is a cross-sectional view of the lens driving module of FIG. 3A cut along a line IV-IV according to an embodiment of the present disclosure. FIGS. 5 to 7 are enlarged perspective views of a stator, a rotator, and a rotation connecting unit of a lens driving module according to various embodiments of the present disclosure.

Referring to FIGS. 4 to 7, the plurality of coils 411 may be arranged on an outer peripheral surface of the stator 410. The yoke 413 may be combined with the outer peripheral surface of the stator 410 to fix the plurality of coils 411. The plurality of coils 411 may be arranged along a circumferential direction of the stator 410. The plurality of coils 411 may be arranged in a ring shape.

The plurality of coils 411 may be fixed to the yoke 413 through bonding. The plurality of coils 411 are illustrated as being bonded and directly fixed to the yoke 413. However, the present disclosure is not limited thereto. For example, the plurality of coils 411 may be fixed to a printed circuit board (PCB) and the PCB may be bonded to the yoke 413 (i.e., the plurality of coils 411 may be indirectly fixed to the yoke 413).

The yoke 413 may block a magnetic flux generated by magnetic interaction between the plurality of coils 411 and the yoke 413 from dissipating to the outside.

Since the plurality of coils 411 may be fixed to the stator 410 through bonding, supporting shafts for supporting the plurality of coils 411 inside each of plurality of coils 411 may not be necessary.

If supporting shafts are arranged inside each of the plurality of coils 411, a magnetic flux with a high density may be obtained as compared to when no supporting shafts are arranged in each of the plurality of coils 411. However, a cogging torque may occur due to a relationship between supporting shafts and the plurality of magnets 431. According to various embodiments, an effect of the cogging torque may be minimized by not using the supporting shafts inside the plurality of coils 411.

In addition, since no supporting shafts are placed inside of the coils 411, other members may be mounted inside of the coils 411. For example, the detection sensor 440 may be arranged inside of the coils 411 for detecting a rotational angle of the rotator 430. For example, the detection sensor 440 may be arranged inside a portion of the plurality of coils 411.

The rotator 430 may have the plurality of magnets 431 arranged on an inner peripheral surface thereof. Each of the plurality of magnets 431 may be a permanent magnet. The rotator 430 may include a yoke 433 supporting the plurality of magnets 431. For example, the rotator 430 may not include a separate configuration and a portion of the rotator 430 may function as the yoke 433. The yoke 433 of the rotator 430, along with the yoke 413 of the stator 410, may block dissipation of the magnetic flux generated by a magnetic interaction between the plurality of coils 411 and the plurality of magnets 431 to the outside.

The plurality of magnets 431 may be arranged in a ring shape. For example, the plurality of magnets 431 may be arranged on an inner circumferential surface of the rotator 430. The magnets 431 may be arranged along the circumferential direction so that respective N-poles and S-poles of the plurality of magnets 431 are alternatively arranged.

The rotation connecting units 450*a* and 450*b* may connect the rotator 430 to the stator 410 such that the rotator 430 may rotate with respect to the stator 410 to maintain a gap between the coils 411 and the magnets 431. The rotation connecting units 450*a* and 450*b* may connect the rotator 430 to the stator 410 such that the rotator 430 may rotate in a direction of rotation without wobbling in the direction of the optical axis Z. The rotation connecting units 450*a* and 450*b* may include several connecting units. For example, two of the rotation connecting units 450*a* and 450*b* may be arranged along the optical axis Z.

The rotation connecting units 450*a* and 450*b* may include an inner supporting member 451, an outer supporting member 452, and a plurality of rotation members 453 arranged therebetween. The inner supporting member 451 may be fixed to the stator 410 and the outer supporting member 452 may be fixed to the rotator 430. The inner supporting member 451 and the outer supporting member 452 may include supporting grooves 4511 and 4521 having a shape corresponding to a shape of the rotation member 453. The rotator 430 may rotate without wobbling in the optical axis Z due to the supporting grooves 4511 and 4521.

The rotation member 453 may have a spherical shape, and supporting grooves 4511 and 4521 may have an arc shape corresponding to the shape of the rotation member 453.

Figure 8:
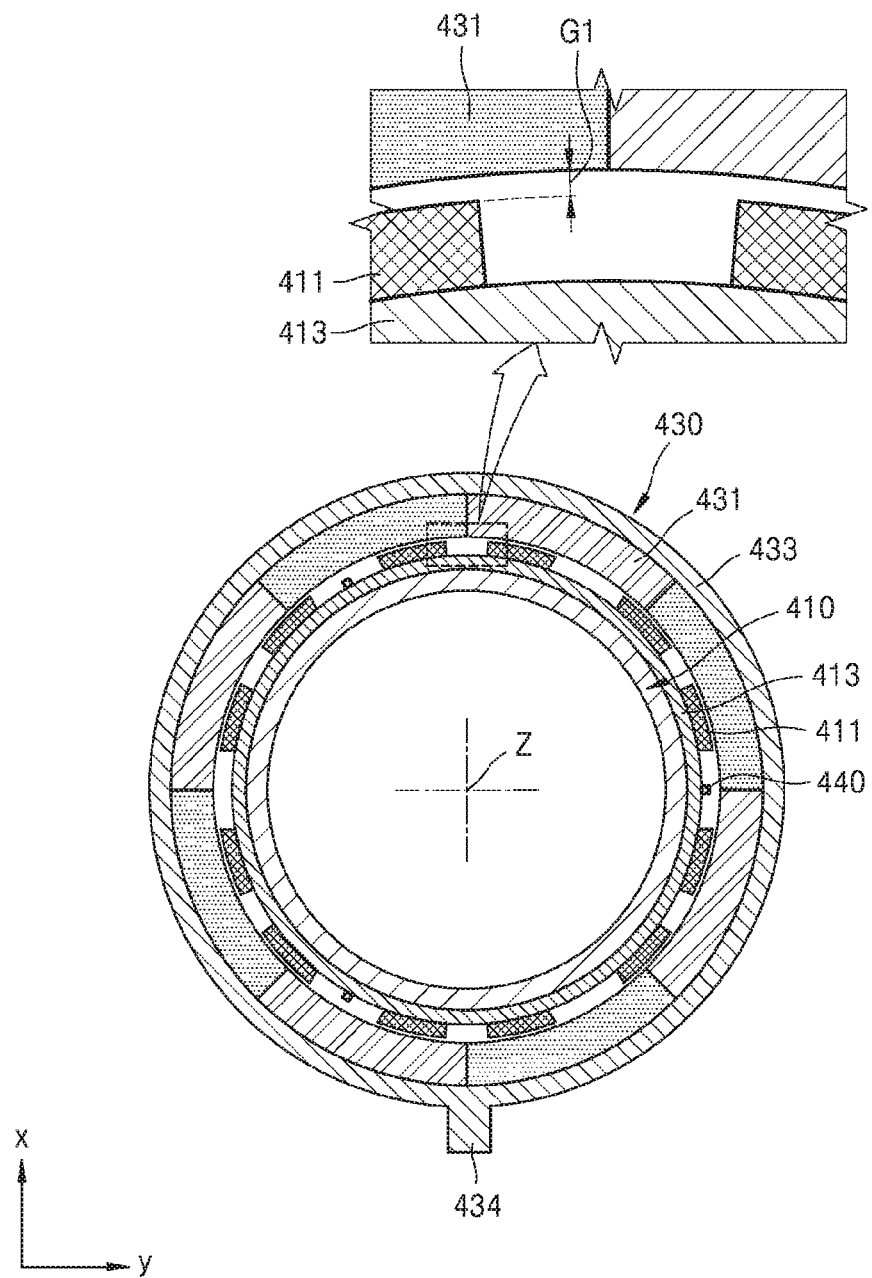
FIG. 8 is a cross-sectional view of the lens driving module of FIG. 3A cut along a line VIII-VIII according to an embodiment of the present disclosure.

FIG. 8 is a cross-sectional view of the lens driving module of FIG. 3A cut along a line VIII-VIII according to an embodiment of the present disclosure.

Referring to FIG. 8, the magnets 431 of the rotator 430 and the coils 411 of the stator 410 may be spaced apart from each other in a direction perpendicular to the optical axis Z, for example, in a radial direction of the rotator 430. In other words, a gap G1 for the magnetic interaction between coils 411 and magnets 431 may be formed between the plurality of coils 411 and the plurality of magnets 431.

Figure 9:
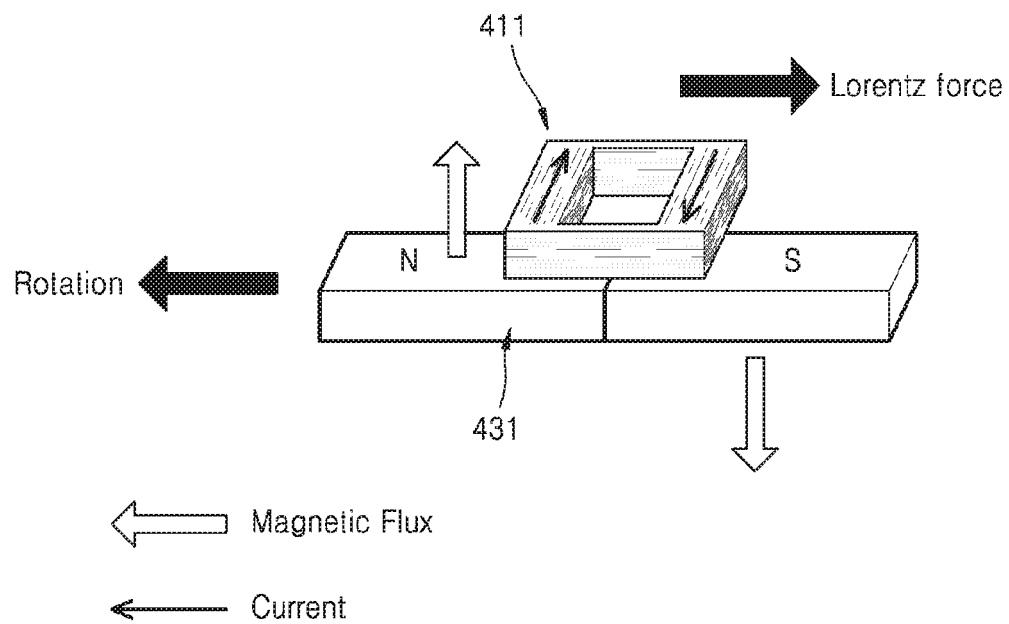
FIG. 9 is a diagram illustrating a rotation principle of a lens driving module according to an embodiment of the present disclosure.
Figure 10:
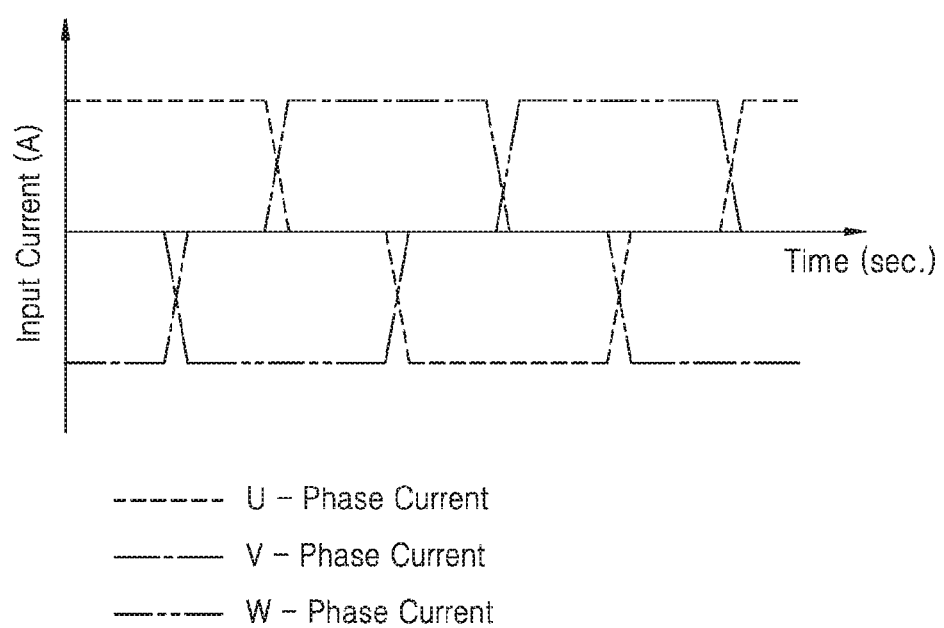
FIG. 10 is a graph of an electric signal input to a coil of a lens driving module according to an embodiment of the present disclosure.

FIG. 9 is a diagram illustrating a rotation principle of a lens driving module according to an embodiment of the present disclosure. FIG. 10 is a graph of an electric signal input to a coil of a lens driving module according to an embodiment of the present disclosure.

Referring to FIGS. 9 and 10, a current may be supplied to the coils 411 arranged in a space in which a magnetic field is formed by the magnets 431.

A three-phase electrical signal may be input to the plurality of coils 411 during a continuous rotation of the rotator 430. For example, the 3-phase electrical signal, each signal having a phase difference of 120 degrees and being expressed as U-V-W phases, may be input to the plurality of coils 411. A respective connection between phases may be a star connection. A number of the plurality of coils 411 may implemented in intervals of 3.

As the current is supplied to the coils 411, a Lorentz force is applied to the plurality of coils 411 in a certain direction according to the Fleming's left-hand rule. Since the plurality of coils 411 are fixed to the stator 410, a force is applied to the plurality of magnets 431 in a direction opposite the direction of the Lorentz force according to the law of action and reaction.

Since the rotator 430 has a structure capable of rotating due to rotation connecting units 450a and 450b, the rotator 430 may rotate with respect to the stator 410. A rotation speed of the rotator 430 with respect to the stator 410 may be less than or equal to about 100 rpm. Dissipation of the magnetic flux generated by the magnetic interaction between the plurality of coils 411 and the plurality of magnets 431 to the outside may be minimized by the yoke 413 of the stator 410 and the yoke 433 of the rotator 430, and thus, a magnetic closed loop may be formed.

When the magnets 431 rotate, a change may occur in a magnetic flux passing through the detection sensor 440 arranged inside coils 441 and a rotational angle of the rotator 430 may be detected based on the change in the magnetic flux. When the current input to coils 411 is instantaneously changed according to the detected rotational angle, a continuous rotation movement of rotating components may be possible.

Figure 11A:
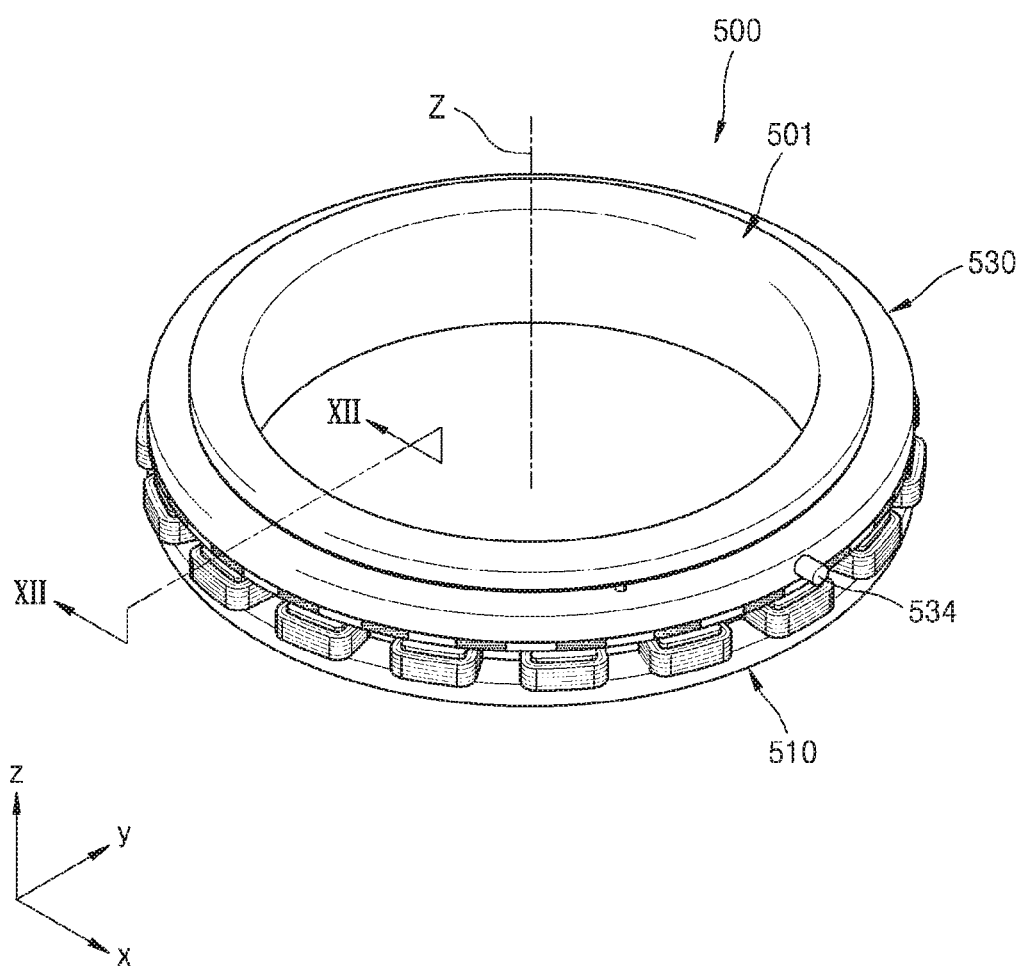
FIG. 11A is a perspective view of a lens driving module according to according to various embodiments of the present disclosure.
Figure 11B:
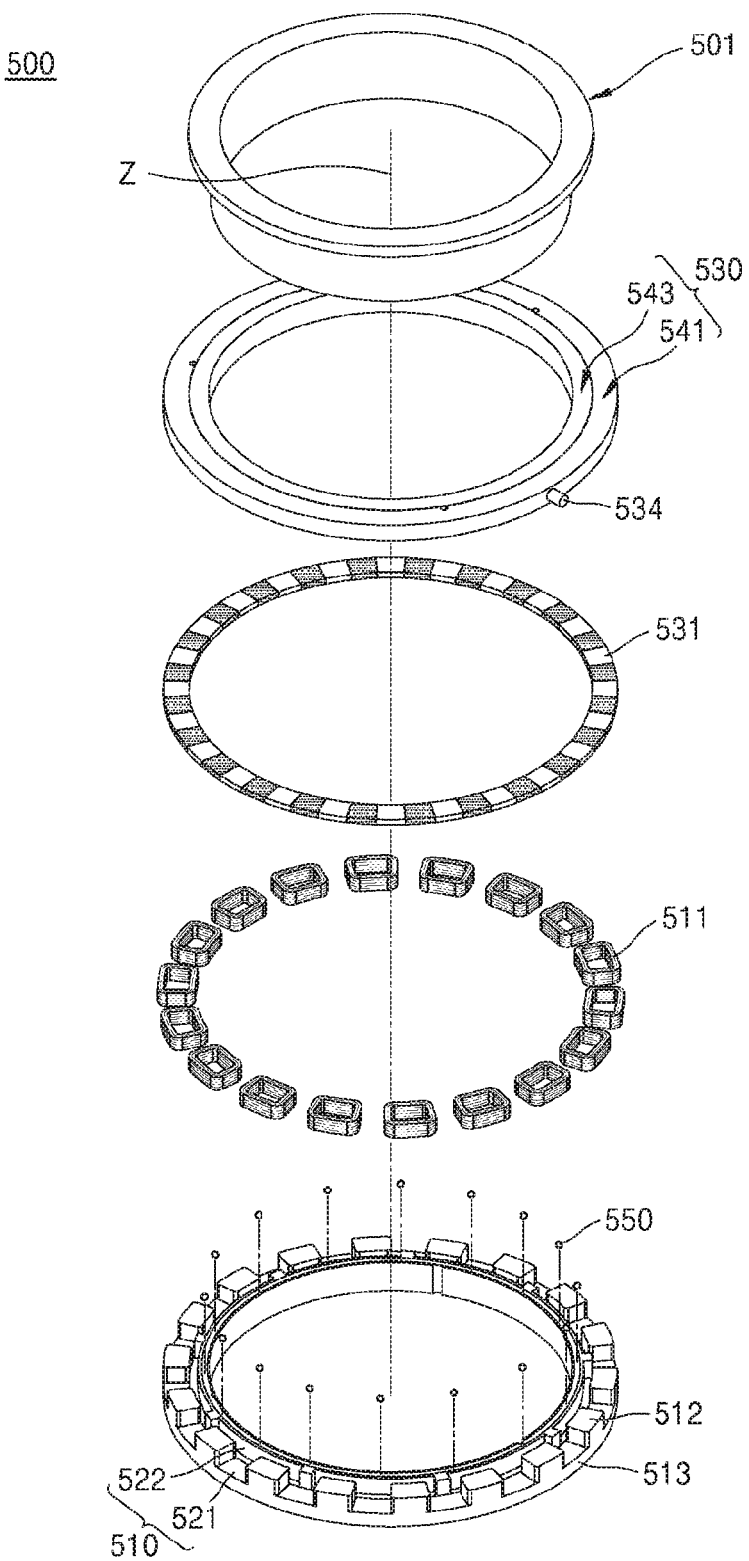
FIG. 11B is an exploded perspective view of the lens driving module of FIG. 11A according to various embodiments of the present disclosure.
Figure 12:
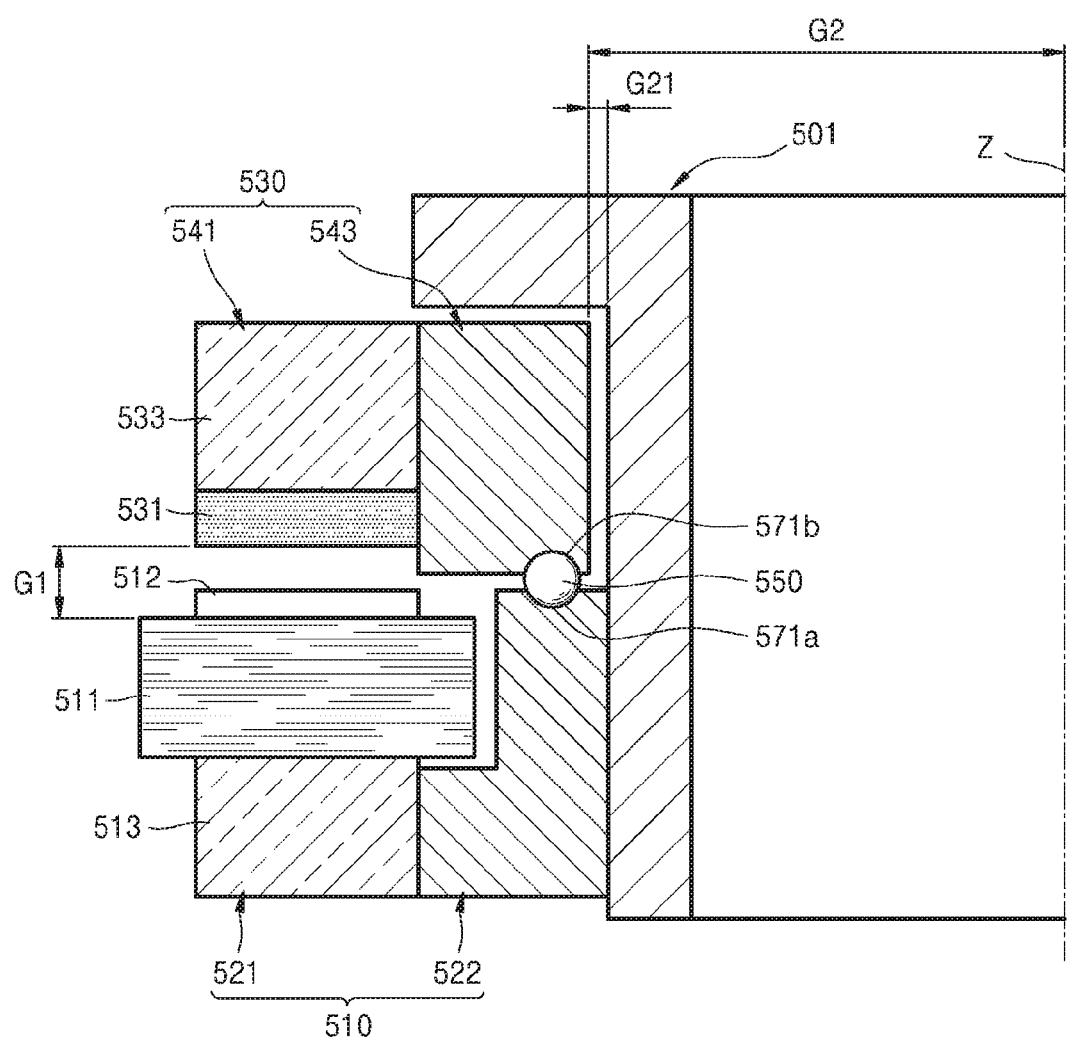
FIG. 12 is a cross-sectional view of the lens driving module FIG. 11A cut along a line XII-XII according to an embodiment of the present disclosure.

FIG. 11A is a perspective view of a lens driving module according to various embodiments of the present disclosure and FIG. 11B is an exploded perspective view of the lens driving module of FIG. 11A according to various embodiments of the present disclosure. FIG. 12 is a cross-sectional view of the lens driving module of FIG. 11A cut along a line XII-XII according to an embodiment of the present disclosure.

Referring to FIGS. 11A, 11B, and 12, a lens driving module 500 may include a base 501, a stator 510 fixed to the base 501, and a rotator 530 rotating with respect to the stator 510, according to various embodiments of the present disclosure.

Each of the base 501, the stator 510, and the rotator 530 may have a hollow cylindrical shape through which an optical axis Z passes. The stator 510 and the rotator 530 may be arranged on an outer side of the base 501. The rotator 530 and the stator 510 may be arranged along the optical axis Z and the rotator 530 may rotate with respect to the base 501 and the stator 510 with the optical axis Z as a center line.

The rotator 530 may transfer a rotational force to components supporting lenses of the lens unit 10 (e.g., the barrel 700). The rotator 530 may include a driving force transfer unit 534 transferring a driving force to the barrel. For example, the driving force transfer unit 534 may be extended in a direction perpendicular to the optical axis Z.

Since the base 501, the stator 510, and the rotator 530 may have a hollow cylindrical shape and the rotator 530 may include the driving force transfer unit 534 for transferring the driving force to other components, the lens driving module 500 may be arranged along the optical axis Z together with other components of the lens unit 10. Thus, an increase in a radial direction of the lens unit 10 due to the lens driving module 500 may be prevented.

The stator 510 may be arranged on an outer surface of the base 501 and may include a plurality of coils 511 and a yoke 513 for supporting the plurality of coils 511. The yoke 513 may prevent a magnetic flux generated by a magnetic interaction between the plurality of coils 511 and a plurality of magnets 531 from dissipating.

The yoke 513 may include a plurality of teeth 512 spaced apart from each other along a circumferential direction. The plurality of teeth 512 may have a shape extending along a direction parallel with the optical axis Z. The plurality of coils 511 may be respectively wound onto the teeth 512. The stator 510 may include slots between the plurality of teeth 512 and accommodating coils 511 wound onto the teeth 512. A plurality of slots may be spaced apart from each other along the circumferential direction. In other words, the teeth 512 and the slots may be alternatively arranged in the circumferential direction.

The rotator 530 may include the plurality of magnets 531 and a yoke 533 supporting the magnets 531. The magnets 531 may be arranged along the circumferential direction. The magnets 531 may be arranged in the circumferential direction so that respective N-poles and S-poles of each of the magnets 531 are alternatively arranged. The plurality of magnets 531 may be permanent magnets.

The stator 510 and the rotator 530 may be arranged along the optical axis Z. The plurality of coils 511 of the stator 510 and the plurality of magnets 531 of the rotator 530 may be spaced apart from each other along the optical axis Z. A rotation connecting member 550 may be arranged between the stator 510 and the rotator 530 to maintain the gap G1 between the coils 511 and the magnets 531.

The rotation connecting member 550 may support the rotator 530 such that the rotator 530 may maintain the gap G1 with respect to the stator 510. When the rotator 530 rotates, the rotation connecting member 550 may connect the rotator 530 and the stator 510 such that the rotator 530 may maintain the gap from the stator 510 along the optical axis Z. For example, the rotation connecting member 550 may be a spherical shape which is rollable.

A number of the plurality of magnets 531 of the rotator 530 may correspond to the number of teeth 512 with the plurality of coils 511 wound thereon. However, the embodiment is not limited thereto. According to various embodiments of the present disclosure, a vernier structure may be applied to the lens driving module 500, and numbers of the stator 510, the plurality of teeth 512, and the plurality of magnets 531 of the rotator 530 may be expressed as follows.

$$Z_2 = Z_1 \pm P \quad \text{Equation (1)}$$

where $Z_2$ is a number of magnetic dipoles of the rotator 530, $Z_1$ is a number of the plurality of teeth 512 of the stator 510, and P is a number of magnetic dipoles of the stator 510.

In Equation (1), $Z_2$ is a number of magnetic dipoles formed by the plurality of magnets 531 arranged on the rotator 530, and P is a number of magnetic dipoles formed by the plurality of coils 511 wound on the stator 510. For example, when 48 magnets are arranged on the rotator 530 of the lens driving module 500, there may be 24 magnetic dipoles of the rotator 530. Also, there may be 18 teeth formed on the stator 530 along the circumferential direction of the stator 510 core. In addition, if the lens driving module 500 is of a three-phase type, a number of 18 teeth 512 may be equally spaced apart from each other and the plurality of coils 511 may be respectively wound on the 18 teeth 512. Thus, a number of the magnetic dipoles of the stator 510 may be 6. Thus, it may be verified that the lens driving module 500 including the vernier structure satisfies Equation (1).

A speed of the lens driving module 500 including the vernier structure may be reduced at a rate of $P/Z_2$ in comparison with the speed of a lens driving module of the related art, and accordingly, a torque density may be increased. Thus, according to various embodiments of the present disclosure, the lens driving module 500 may be driven at a rate of about ¼ in comparison with the lens driving module of the related art and may generate a torque four times greater, and thus, may be applied to a driving apparatus requiring a high torque at a low speed, for example, a driving apparatus for a lens of a photographing apparatus or for a barrel with a lens equipped thereon.

The lens driving module 500 may include a gap maintaining unit to make the rotator 530 maintain a certain gap from the optical axis Z in a direction perpendicular to the optical axis Z when the rotator 530 rotates according to various embodiments.

For example, the gap maintaining unit may be configured to limit the rotation connecting member 550 from moving in a direction perpendicular to the optical axis Z. The gap maintaining unit may include a first movement limiting unit 571a arranged on the stator 510 and a second movement limiting unit 571b arranged on the rotator 530 to limit the rotation connecting member 550 from moving in a direction perpendicular to the optical axis Z. The first movement limiting unit 571a and the second movement limiting unit 571b may have a shape corresponding to a portion of the shape of the rotation connecting member 550. When a cross-sectional shape of the rotation connecting member 550 is circular, the cross-sectional shape of the first movement limiting unit 571a and the second movement limiting unit 571b may be an arc shape.

Since the rotation connecting member 550 is limited from moving in a direction perpendicular to the optical axis Z by the first movement limiting unit 571a and the second movement limiting unit 571b, a gap G21 between the rotator 530 and the base 501 may be maintained while the rotator 530 rotates with respect to the stator 510. Accordingly, a gap G2 between the optical axis Z and the rotator 530 may be maintained and the rotator 530 may rotate without wobbling in a direction perpendicular to the optical axis Z and with respect to the stator 510.

At least one of the stator 510 and the rotator 530 may include two members including different materials.

For example, the stator 510 may include a contact member 522 contacting the rotation connecting member 550 and a coil supporting member 521 supporting the plurality of coils 511. The rotator 530 may include a contact member 543 contacting the rotation connecting member 550 and a magnet supporting member 541 supporting the plurality of magnets 531. The magnet supporting member 541 may include the yoke 533. The coil supporting member 521 may include the plurality of teeth 512 and the yoke 513 supporting the plurality of teeth 512.

When the rotator 530 rotates, the contact member 522 of the stator 510 and the contact member 543 of the rotator 530 may generate repeated friction with the rotation connecting member 550. The contact members 522 and 543 of the stator 510 and the rotator 530 may include a material with high wear resistance or high hardness to prevent damage due to the repeated friction. For example, the contact members 522 and 543 may include steel having a grade of SUS 440C. The contact members 522, 543 may be non-magnetic.

The coil supporting member 521 and the magnet supporting member 541 prevent loss of the magnetic flux generated by the magnetic interaction between the magnets 531 and the coils 511 and may include a magnetic material. For example, the coil supporting member 521 and the magnet supporting member 541 may include steel having a grade of SUS 420J2.

The stator 510 may be manufactured by assembling the coil supporting member 521 and the contact member 522. For example, the contact member 522 and the coil supporting member 521 may be assembled in a tight-fit manner by forming an inner diameter of the coil supporting member 521 to be somewhat less than or equal to an outer diameter of the contact member 522. However, manufacturing of the stator 510 is not limited to assembling only and may be possible by bonding or using a bolt joint of the coil supporting member 521 and the contact member 522.

The rotator 530 may be manufactured by assembling the magnet supporting member 541 and the contact member 543. For example, the contact member 543 and the magnet supporting member 541 may be assembled in a tight-fit manner by forming an inner diameter of the magnet supporting member 541 to be somewhat less than or equal to an outer diameter of the contact member 543. However, manufacturing of the rotator 530 is not limited to assembling only and may be possible by bonding or using a bolt joint of the magnet supporting member 541 and the contact member 543.

Figure 13A:
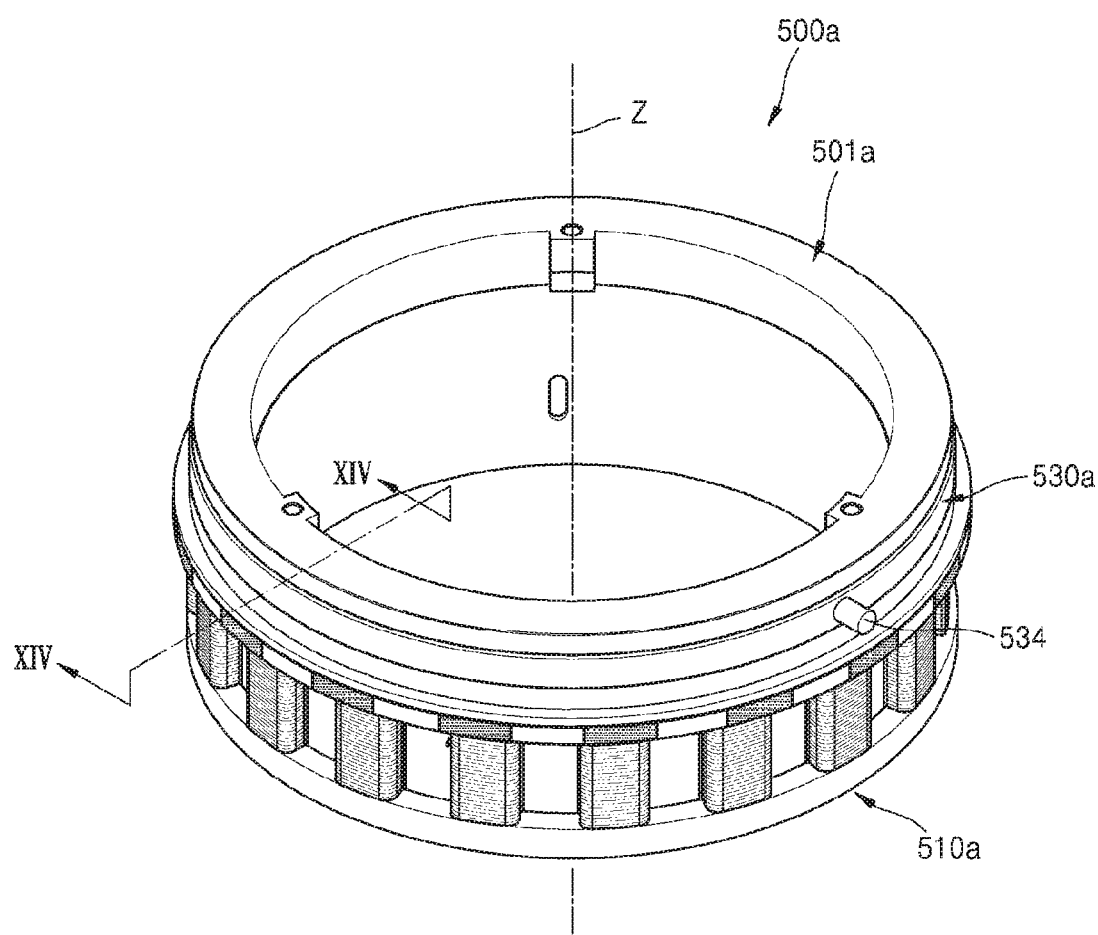
FIG. 13A is a perspective view of a lens driving module according to various embodiments of the present disclosure.
Figure 13B:
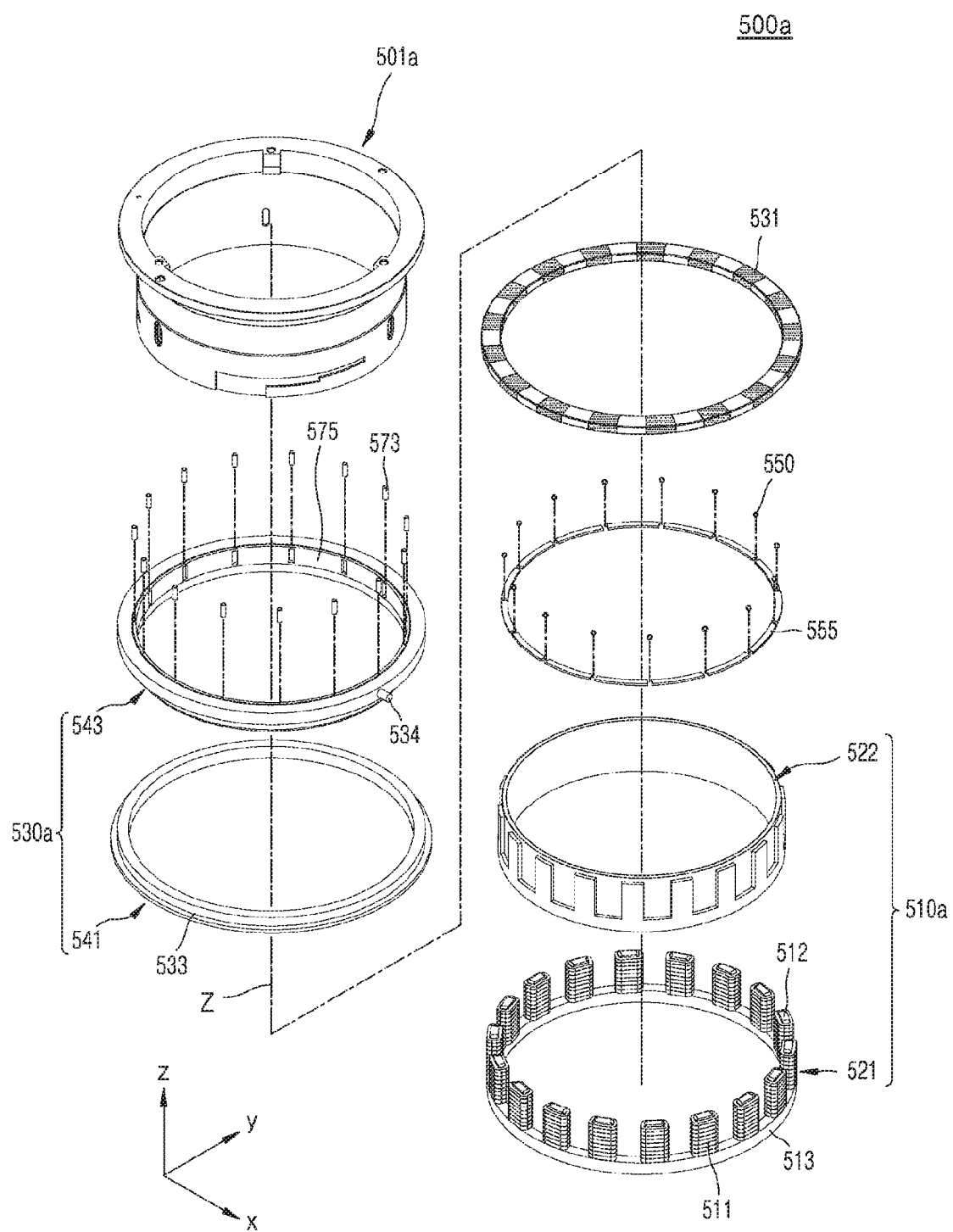
FIG. 13B is an exploded perspective view of the lens driving module of FIG. 13A according to various embodiments of the present disclosure.
Figure 14:
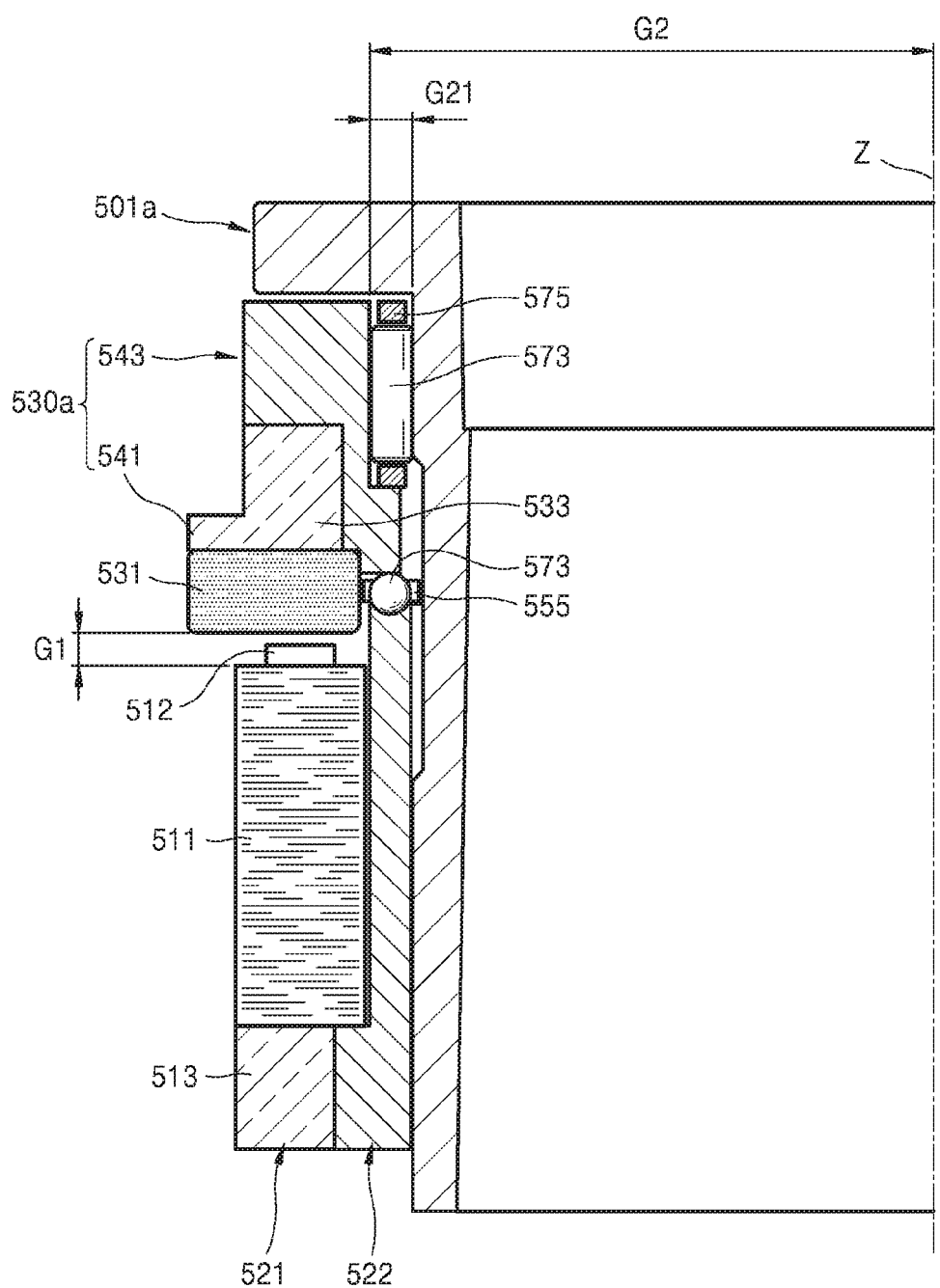
FIG. 14 is a cross-sectional view of the lens driving module of FIG. 13A cut along a line XIV-XIV according to an embodiment of the present disclosure.

FIG. 13A is a perspective view of a lens driving module according to various embodiments of the present disclosure, and FIG. 13B is an exploded perspective view of the lens driving module of FIG. 13A according to various embodiments of the present disclosure. FIG. 14 is a cross-sectional view of the lens driving module of FIG. 13A cut along a line XIV-XIV according to an embodiment of the present disclosure.

Referring to FIGS. 13A to 14, a lens driving module 500a may include a base 501a, a stator 510a fixed to the base 501a, a rotator 530a rotating with respect to the stator 510a and including a driving force transfer unit 534, a rotation connecting member 550 arranged between the stator 510a and the rotator 530a, and a gap maintaining unit that maintains a gap between the rotator 530a and an optical axis Z in a direction perpendicular to the optical axis Z in the lens driving module 500a. Other configurations similar to the lens driving module 500 according to various embodiments of the present disclosure, and a duplicate description will be omitted.

The gap maintaining unit may include a plurality of movement limiting members 573 arranged between the base 501a and the rotator 530a. The movement limiting members 573 may be arranged to be in contact with the rotator 530a and the base 501a. The movement limiting members 573 may be rolled due to the rotator 530a when the rotator 530a rotates, for example, in a cylindrical shape. The movement limiting members 573 may be referred as a pin bearing. As another example, the movement limiting members 573 may have a spherical shape. Spacers 575 may be arranged to maintain gaps between each adjacent pair of the plurality of movement limiting members 573 constant.

The rotation connecting member 550 may be arranged between the stator 510a and the rotator 530a. The rotation connecting member 550 may be arranged to be in contact with the stator 510a and the rotator 530a. The rotation connecting member 550 may be rolled due to the rotator 530a when the rotator 530a rotates, for example, in a spherical shape. The rotation connecting member 550 may be referred to as a ball bearing. Spacers 555 may be arranged to maintain gaps between each adjacent pairs of the plurality of rotation connecting members 550 constant.

When the rotator 530a rotates due to an interaction between a plurality of magnets 531 of the rotator 530a and a plurality of coils 511 of the stator 510a, the rotation connecting member 550 may support the rotator 530a such that the rotator 530a may rotate with respect to the stator 510a. The plurality of movement limiting members 573 arranged between the base 501a and the rotator 530a may maintain the gap G21 between the base 501a and the rotator 530a constant. Thus, the rotator 530a may rotate without wobbling in a direction perpendicular to the optical axis Z and with respect to the stator 510a.

In various embodiments described above, the movement limiting members 573, which are arranged between the base 501a and the rotator 530a, were explained as a different body with the base 501a and the rotator 530a. However, various embodiments are not limited thereto. For example, the plurality of movement limiting members 573 may be formed onto the rotator 530a as one body and may have a bump shape protruding toward the base 501a.

Figure 15A:
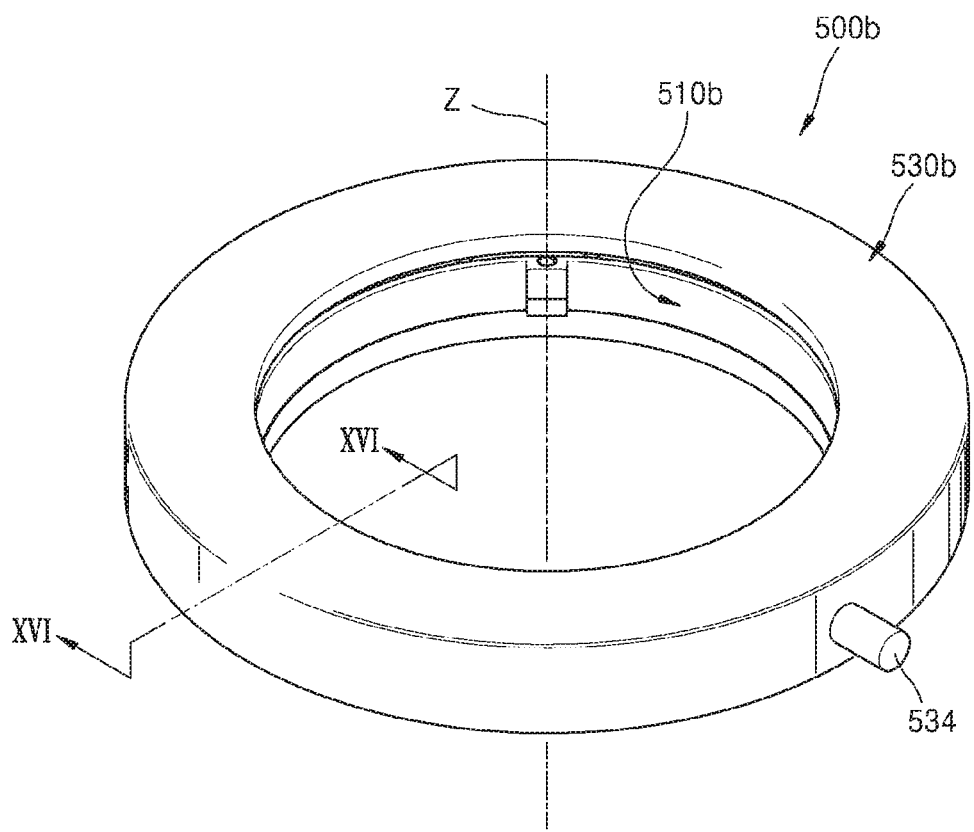
FIG. 15A is a perspective view of a lens driving module according to various embodiments of the present disclosure.
Figure 15B:
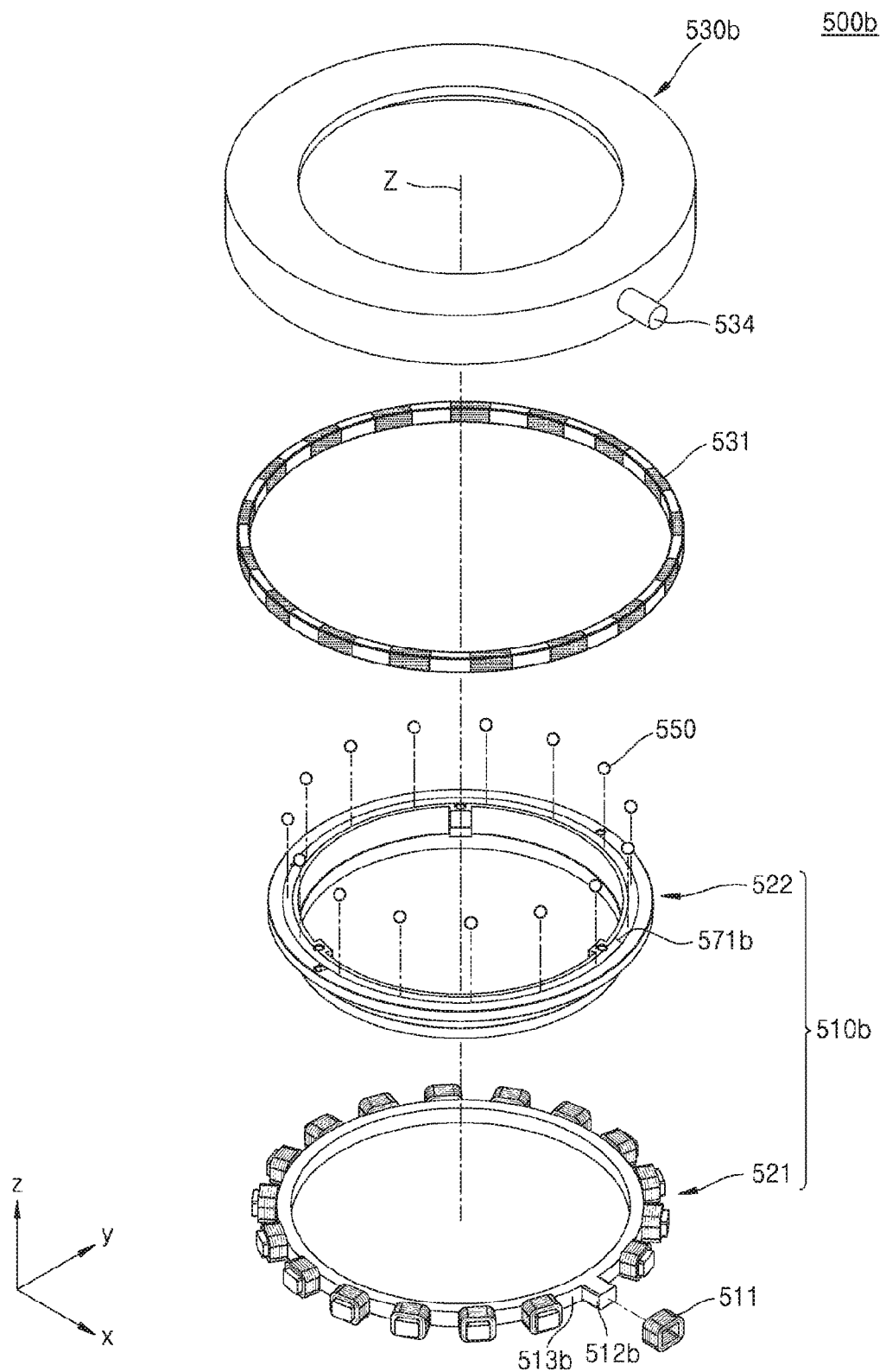
FIG. 15B is an exploded perspective view of the lens driving module of FIG. 15A according to various embodiments of the present disclosure.
Figure 16:
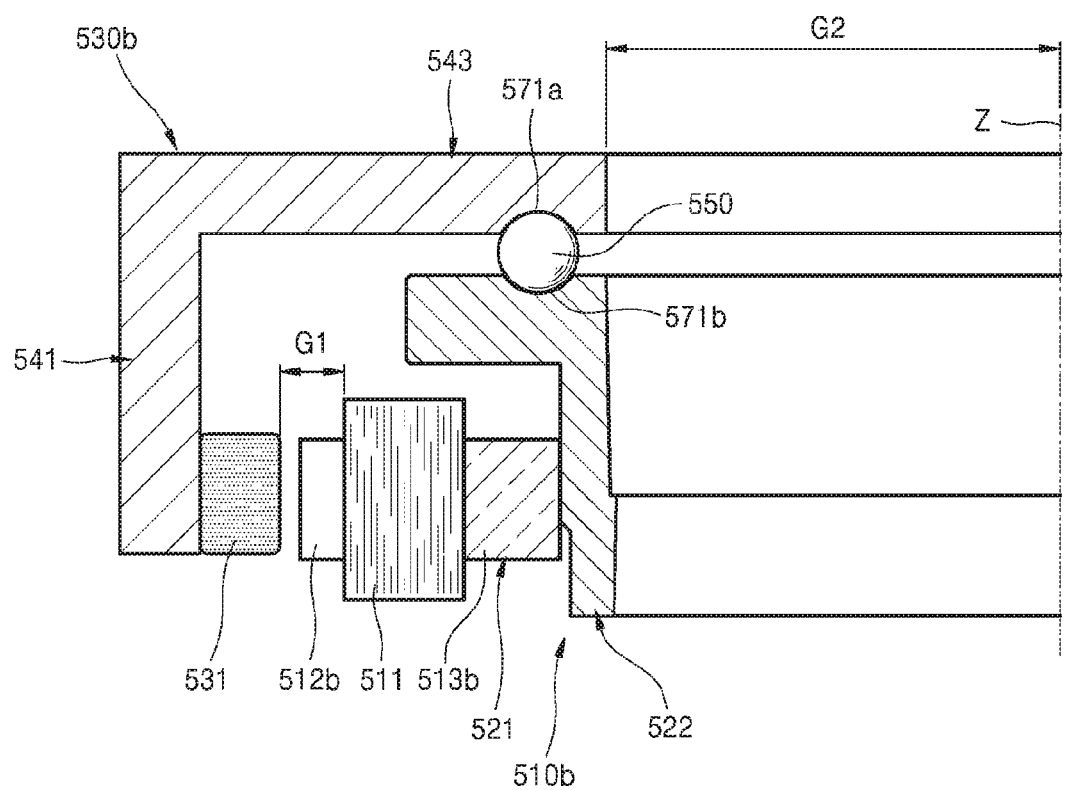
FIG. 16 is a cross-sectional view of the lens driving module of FIG. 15A cut along a line XVI-XVI according to an embodiment of the present disclosure.

FIG. 15A is a perspective view of a lens driving module according to various embodiments of the present disclosure, and FIG. 15B is an exploded perspective view of the lens driving module of FIG. 15A according to various embodiments of the present disclosure. FIG. 16 is a cross-sectional view of the lens driving module of FIG. 15A cut along a line XVI-XVI according to an embodiment of the present disclosure. A duplicate description about the various embodiments described above and identical configurations will be omitted and the description will focus on the different configuration.

Referring to FIGS. 15A to 16, according to various embodiments of the present disclosure, the lens driving module 500b may include a stator 510b, a rotator 530b, a rotation connecting member 550 arranged between the stator 510b and the rotator 510a, and a gap maintaining unit that may maintain a certain gap between the rotator 530b and the optical axis Z in a direction perpendicular to the optical axis Z. Unlike the other embodiments described above, the lens driving module 500b may not include the base 501.

A yoke 513b of the stator 510b may include a plurality of teeth 512b extending in a radial direction. A plurality of coils 511 may be wound on the plurality of teeth 512b. The plurality of coils 511 and a plurality of magnets 531 may be spaced apart from each other in a direction perpendicular to the optical axis Z.

The gap maintaining unit may include a first movement limiting unit 571a arranged on the stator 510b to limit a rotation connecting member 550 from moving in a direction perpendicular to the optical axis Z and a second movement limiting unit 571b arranged on the rotator 530b to limit the rotation connecting member 550 from a movement in a direction perpendicular to the optical axis Z. For example, a first movement limiting unit 571a and a second movement limiting unit 571b may have a shape corresponding to a portion of the shape of the rotation connecting member 550. When a cross-sectional shape of the rotation connecting member 550 is circular, a cross-sectional shape of the first movement limiting unit 571a and the second movement limiting unit 571b may be an arc shape.

Since the rotation connecting member 550 is limited from moving in a direction perpendicular to the optical axis Z by the first movement limiting unit 571a and the second movement limiting unit 571b, the gap G1 between the plurality of coils 511 and the plurality of magnets 531 may be maintained constant while the rotator 530b rotates with respect to the stator 510b. Accordingly, the gap G2 between the optical axis Z and the rotator 530b may be maintained constant, and thus, the rotator 530b may rotate without wobbling in a direction perpendicular to the optical axis Z and with respect to the stator 510b.

Figure 17A:
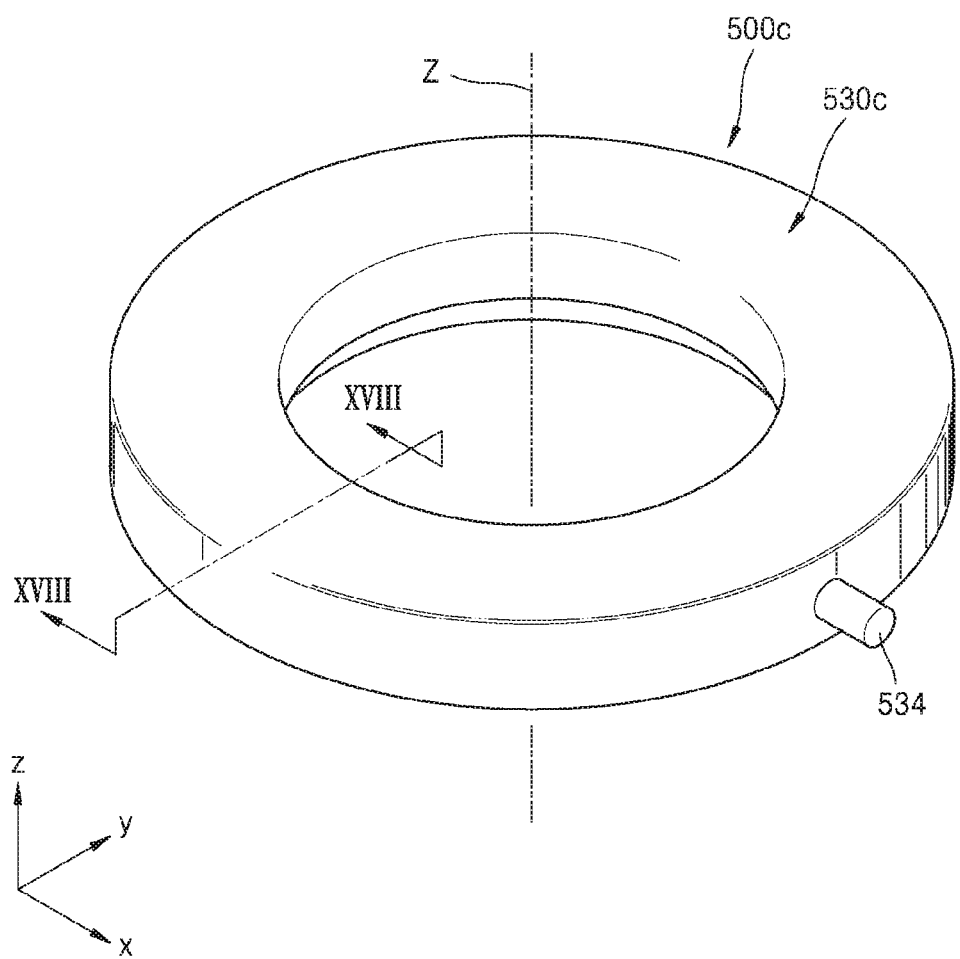
FIG. 17A is a perspective view of a lens driving module according to various embodiments of the present disclosure.
Figure 17B:
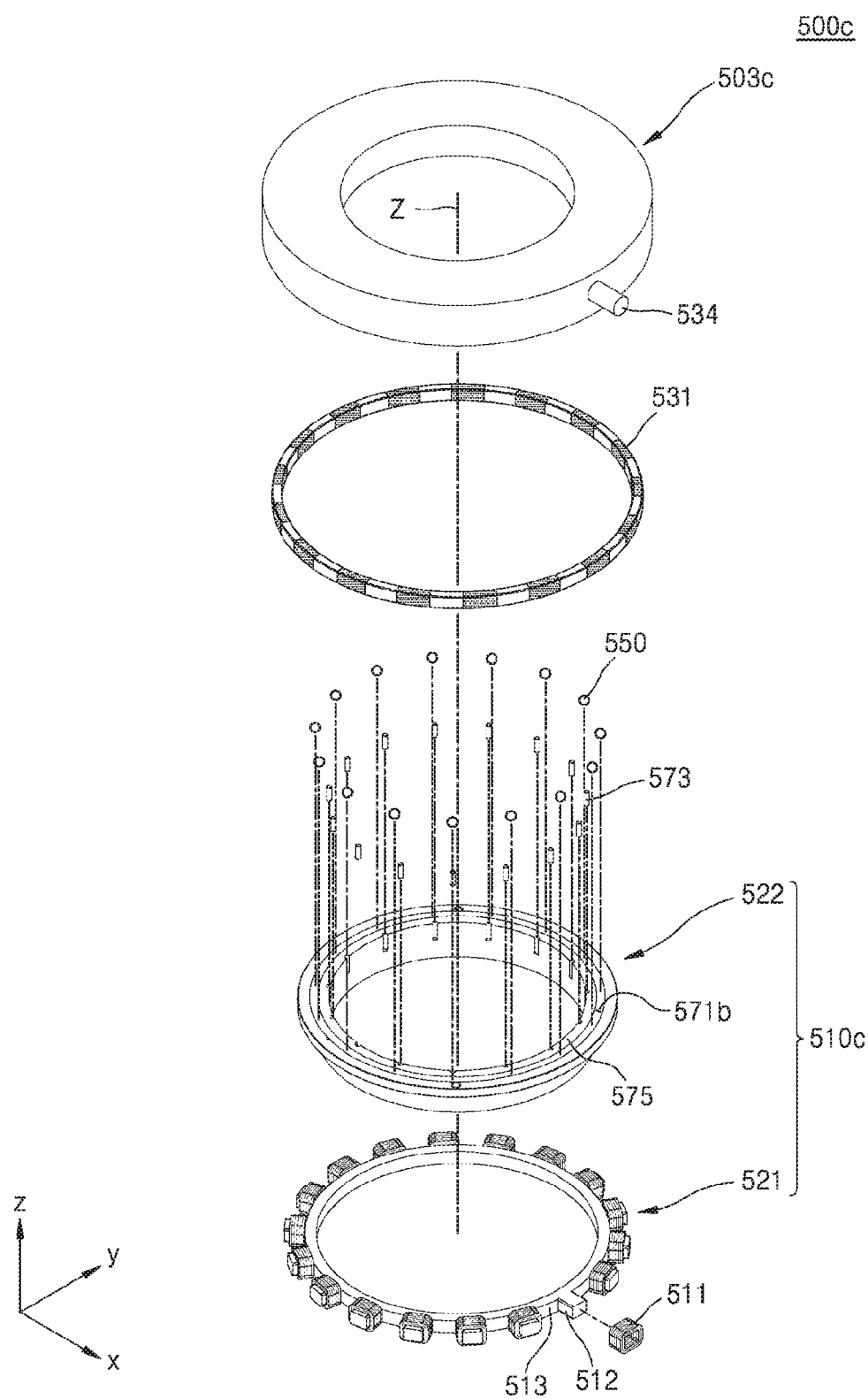
FIG. 17B is an exploded perspective view of the lens driving module of FIG. 17A according to various embodiments of the present disclosure.
Figure 18:
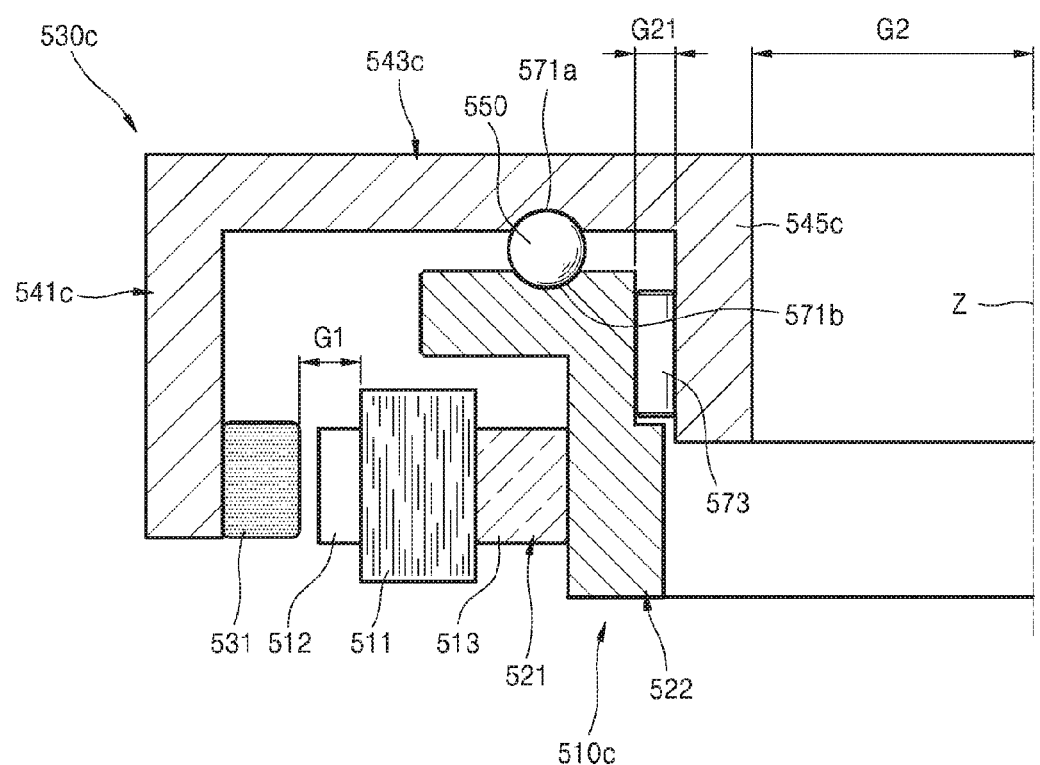
FIG. 18 is a cross-sectional view of the lens driving module of FIG. 17A cut along a line XVIII-XVIII according to an embodiment of the present disclosure.

FIG. 17A is a perspective view of a lens driving module according to various embodiments of the present disclosure, and FIG. 17B is an exploded perspective view of the lens driving module of FIG. 17A according to embodiments of the present disclosure. FIG. 18 is a cross-sectional view of the lens driving module of FIG. 17A cut along a line XVIII-XVIII according to an embodiment of the present disclosure.

Referring to FIGS. 17A to 18, a lens driving module 500c may include a stator 510c, a rotator 530c, a rotation connecting member 550 arranged between the stator 510c and the rotator 530c, and a gap maintaining member configured to maintain a certain gap between the rotator 530c and the optical axis Z in a direction perpendicular to the optical axis Z.

The rotator 530c may include an inner inserting unit 545C, a magnet supporting member 541c, and a contact member 543c. The inner inserting unit 545C may extend from the contact member 543c in a direction parallel with the optical axis Z and may be inserted in an inner side of the stator 510c.

The gap maintaining unit may include first and second movement limiting members 571a and 571b and the plurality of movement limiting members 573 arranged between the inner inserting unit 545c and the stator 510c. The plurality of movement limiting members 573 may be a rollable, cylindrical member. A gap G21 between the inner inserting unit 545c and the stator 510c may be maintained by the plurality of movement limiting members 573.

The plurality of movement limiting members 573 may be in contact with the rotator 530c and the inner inserting unit 545c. The plurality of movement limiting members 573 may have rolling shape when the rotator 530c rotates, for example, a cylindrical shape. The plurality of movement limiting members 573 may be referred to as a pin bearing. As another example, although not illustrated, the plurality of movement limiting members 573 may have a spherical shape. Spacers 575 may be arranged to maintain constant gaps between each adjacent pair of the plurality of movement limiting members 573.

As described above, the rotator 530c may be prevented from wobbling in a direction perpendicular to the optical axis Z by the first and second movement limiting members 571a and 571b and the plurality of movement limiting members 573, and accordingly, the rotator 530c may rotate while maintaining the certain gap G2 with respect to the optical axis Z.

Figure 19A:
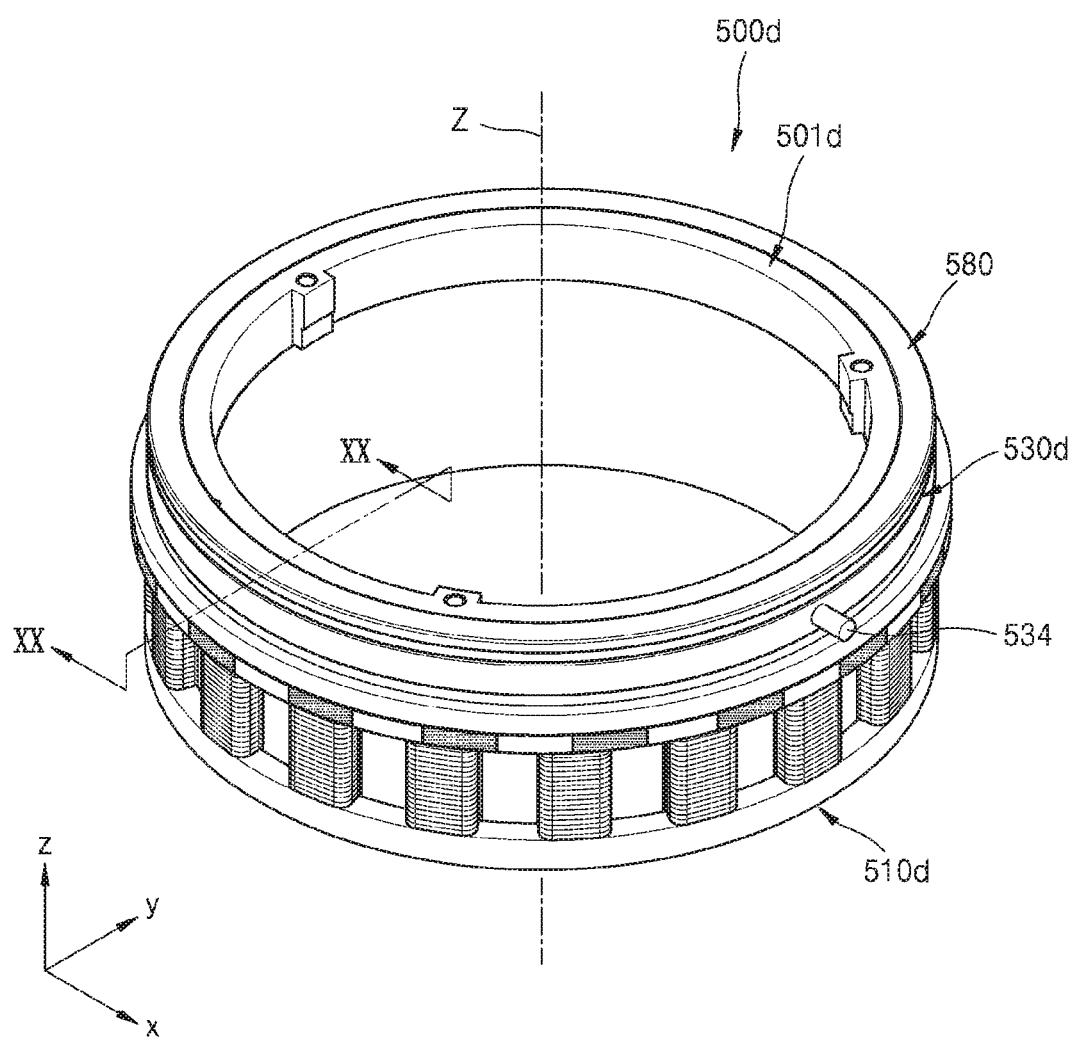
FIG. 19A is a perspective view of a lens driving module according to various embodiments of the present disclosure.
Figure 19B:
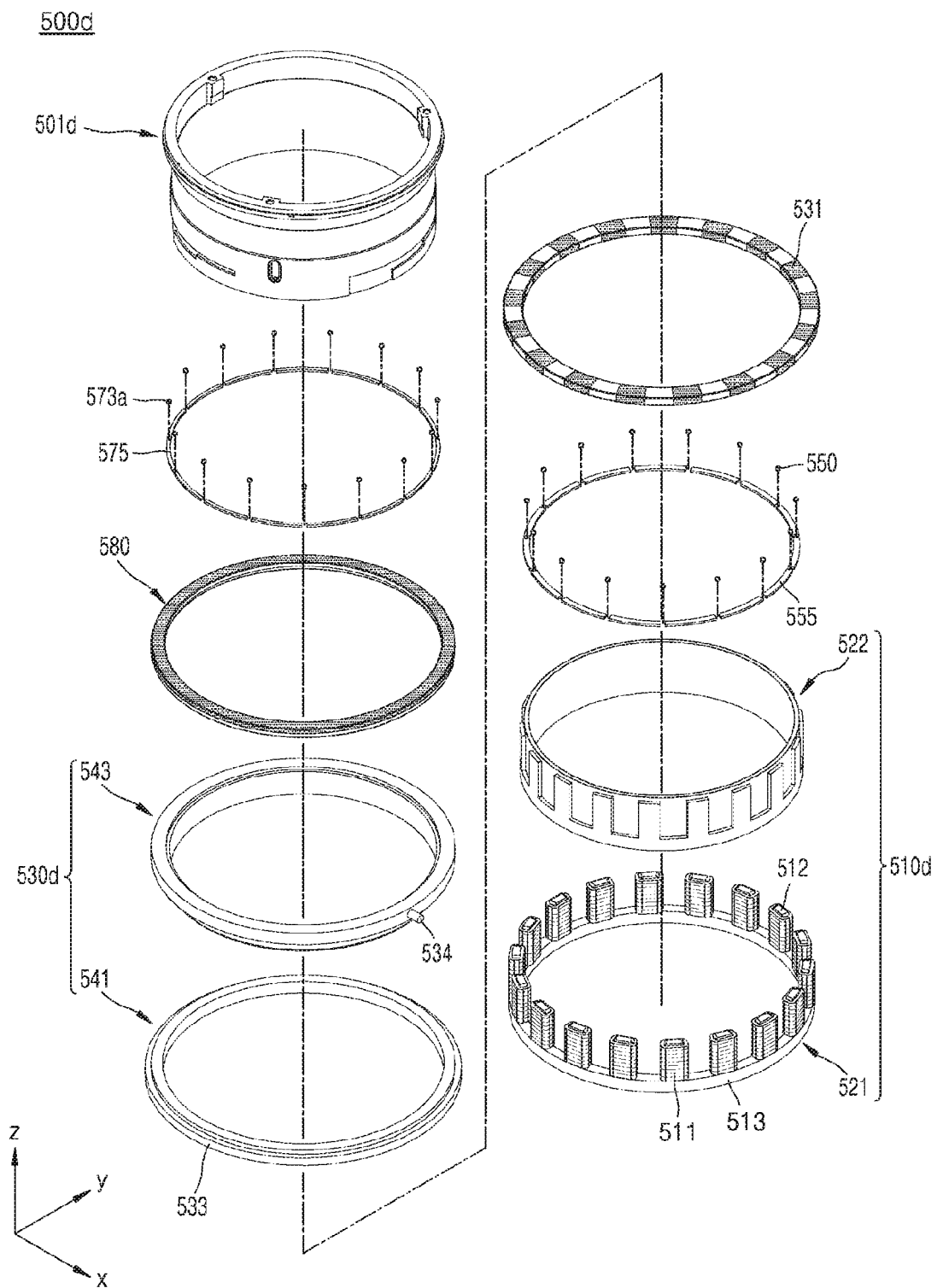
FIG. 19B is an exploded perspective view of the lens driving module of FIG. 19A according to various embodiments of the present disclosure.
Figure 20:
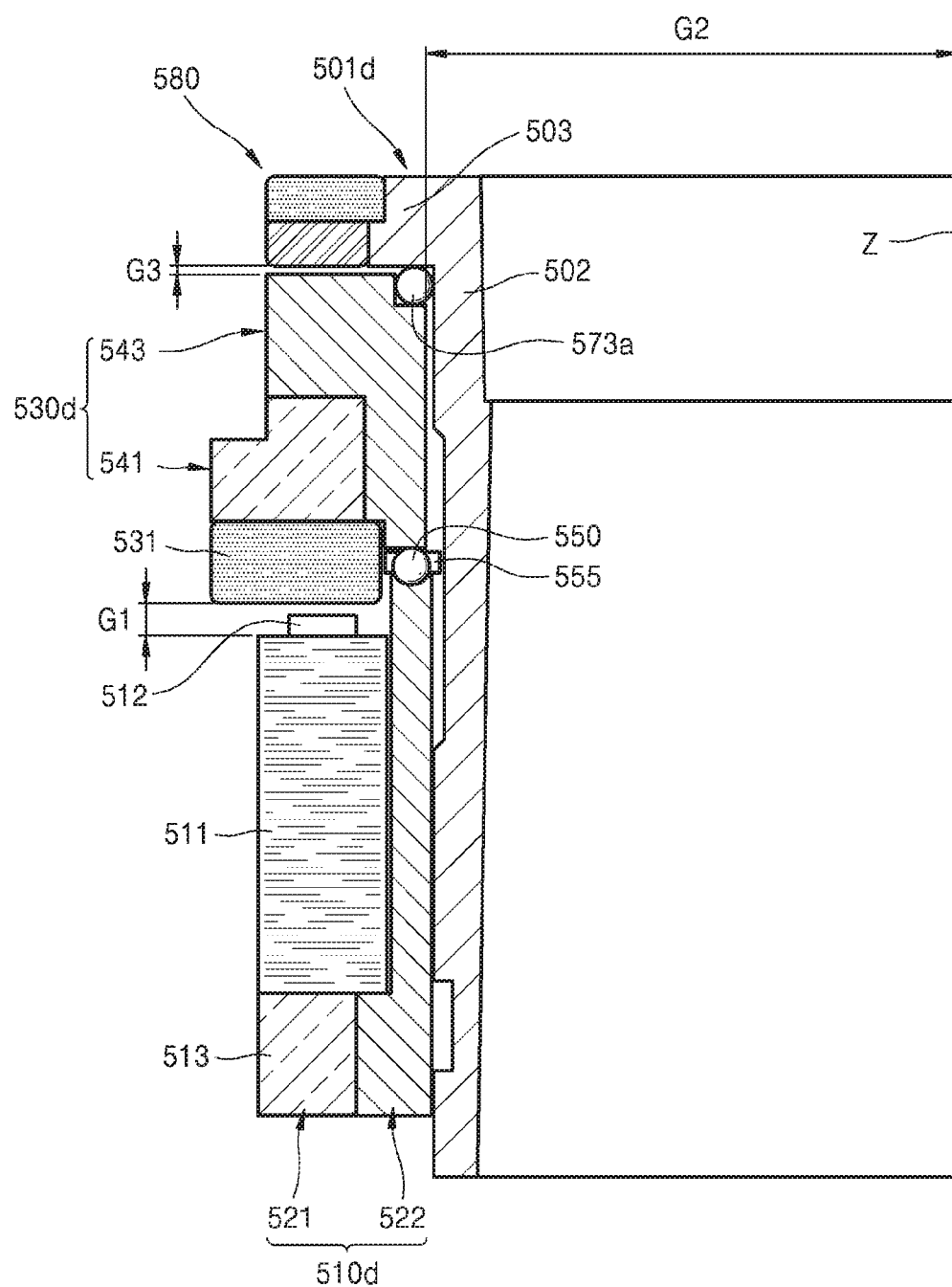
FIG. 20 is a cross-sectional view of the lens driving module of FIG. 19A cut along a line XX-XX according to an embodiment of the present disclosure.

FIG. 19A is a perspective view of a lens driving module according to various embodiments of the present disclosure, and FIG. 19B is an exploded perspective view of the lens driving module of FIG. 19A according to various embodiments of the present disclosure. FIG. 20 is a cross-sectional view of the lens driving module of FIG. 19A cut along a line XX-XX according to an embodiment of the present disclosure.

Referring to FIGS. 19A to 20, a lens driving module 500d may include a base 501d, a stator 510d, a rotator 530d, a rotation connecting member 550, and a gap maintaining unit that maintains a certain gap G2 between the rotator 530d and an optical axis Z.

The base 501d may be arranged in the stator 510d and the rotator 530d and may fix and support the stator 510d. The base 501d may include a body unit 502 extending in a direction parallel with the optical axis Z and a wing unit 503 extending from the body unit 502 in a direction perpendicular to the optical axis Z.

An additional magnet 580 may be arranged on a wing unit 503. The additional magnet 580 may provide a magnetic force for attracting the rotator 530d. For example, the additional magnet 580 may include an N-pole and an S-pole arranged along the optical axis Z. The additional magnet 580 may be a permanent magnet.

Since the additional magnet 580 may attract the rotator 530d along the optical axis Z, a vertical resisting force applied to the rotation connecting member 550 may be reduced. Friction between the rotator 530d and the rotation connecting member 550 and between the stator 510d and the rotation connecting member 550 may be reduced by reducing the vertical resisting force. Accordingly, a durability of the lens driving module 500d may be enhanced.

The gap maintaining unit may include a plurality of movement limiting members 573a arranged between the base 501d and the rotator 530d. The plurality of movement limiting members 573a may be arranged to be in contact with the rotator 530d and the base 501d.

For example, the plurality of movement limiting members 573a may have a spherical shape. The plurality of movement limiting members 573a may be in contact with the rotator 530d and the body unit 502 and the wing unit 503 of the base 501d. For example, the plurality of movement limiting members 573a may contact the rotator 530d at two points, the body unit 502 at one point, and the wing unit 503 at one point. Since the plurality of movement limiting members 573a is in contact with the body unit 502 of the base 501d and the rotator 530d, the rotator 530d may maintain the certain gap G2 from the optical axis Z in a direction perpendicular to the optical axis Z. In addition, since the plurality of movement limiting members 573a may be in contact with the wing unit 503 of the base 501d and the rotator 530d, a gap G3 between the wing unit 503 of the base 501d and the rotator 530d may be maintained constant.

To promote understanding of the present disclosure, reference has been made to the various embodiments illustrated in the drawings, and specific terminology has been used to describe these various embodiments. However, no limitation of the scope of the present disclosure is intended by this specific terminology, and the various embodiments of the present disclosure should be construed to encompass all embodiments that would normally occur to one of ordinary skill in the art.

The words "mechanism," "element," "means," and "configuration" are used broadly and are not limited to mechanical or physical embodiments, and can include software routines in conjunction with processors, etc.

The particular implementations shown and described herein are illustrative examples of the present disclosure and are not intended to otherwise limit the scope of the present disclosure in any way. For the sake of brevity, electronics of the related art, control systems, software development and other functional aspects of the systems may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device. Moreover, no item or component is essential to the practice of the present disclosure unless the element is specifically described as "essential" or "critical." Expressions such as "including" and "equipped with" are technical open transitions.

Furthermore, the recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The present disclosure is not limited to the described order of the steps. The use of any and all examples, or language (e.g., "such as") provided herein, is intended merely to better illuminate the present disclosure and does not pose a limitation on the scope of the present disclosure unless otherwise claimed. Numerous modifications and adaptations will be readily apparent to one of ordinary skill in the art without departing from the spirit and scope of the present disclosure.

It should be understood that the various embodiments described herein should be considered in a descriptive sense only and not for purposes of limitation. Descriptions of the features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A lens driving module for driving a lens along an optical axis, the lens driving module comprising:
   a stator having a hollow cylindrical shape through which the optical axis passes and including coils;
   a rotator having a hollow cylindrical shape through which the optical axis passes, placed on an outer side of the stator, capable of rotating with respect to the stator with the optical axis as a center line, and including magnets facing the coils; and a rotation connecting member connecting the rotator to the stator such that the rotator rotates with respect to the stator to maintain a gap between the coils and the magnets.

2. The lens driving module of claim 1, wherein the rotator further comprises a driving force transfer member configured to transfer a driving force to a barrel on an outer side of the rotator.

3. The lens driving module of claim 1,
wherein the coils are arranged on an outer peripheral surface of the stator along a circumferential direction, and
wherein the magnets are arranged on an inner peripheral surface of the rotator along the circumferential direction.

4. The lens driving module of claim 1, wherein the coils and the magnets are spaced apart from each other in a direction perpendicular to the optical axis.

5. The lens driving module of claim 1, wherein the coils are fixed to the stator through bonding.

6. The lens driving module of claim 1, further comprising:
a detection sensor configured to detect a rotational angle of the stator,
wherein the detection sensor is arranged inside the coils.

7. The lens driving module of claim 1, wherein the rotation connecting member comprises an inner supporting member fixed to the stator, an outer supporting member fixed to the rotator, and rotation members arranged between the inner supporting member and the outer supporting member.

8. A lens driving module for driving a lens along an optical axis, the lens driving module comprising:
a stator having a hollow cylindrical shape through which the optical axis passes and including coils;
a rotator having a hollow shape through which the optical axis passes, placed outside the stator, capable of rotating with respect to the stator with the optical axis as a center line, spaced apart from the stator along the optical axis, and including magnets facing the coils;
a rotation connecting member connecting the rotator to the stator such that a gap is maintained between the rotator and the stator along the optical axis; and
a gap maintaining member to maintain a gap between the rotator and the optical axis in a direction perpendicular to the optical axis.

9. The lens driving module of claim 8, further comprising:
a base on an inner side of the stator and the rotator for fixing and supporting the stator.

10. The lens driving module of claim 9, wherein the gap maintaining member comprises a movement limiting member between the base and the rotator.

11. The lens driving module of claim 9, wherein the base comprises:
a body member extending in a direction parallel with the optical axis,
a wing member extending from the body member in a direction perpendicular to the optical axis, and
an additional magnet that provides a magnetic force to the rotator in a direction in which a gap between the coils and the magnets increases, and
wherein the additional magnet is arranged on the wing member.

12. The lens driving module of claim 11,
wherein the gap maintaining member comprises movement limiting members between the rotator and the body member, and
wherein the gap maintaining member is positioned between the rotator and the wing member.

13. The lens driving module of claim 8, wherein the gap maintaining member comprises:
a first movement limiting member arranged on the stator to limit a movement of the rotation connecting member in a direction perpendicular to the optical axis, and
a second movement limiting member arranged on the rotator to limit a movement of the rotation connecting member in a direction perpendicular to the optical axis.

14. The lens driving module of claim 8,
wherein the stator comprises teeth, and
wherein the coils are wound on the teeth.

15. The lens driving module of claim 8,
wherein the stator comprises a contact member contacting the rotation connecting member and a coil supporting member supporting the coils, and
wherein the rotator comprises:
a contact member contacting the rotation connecting member, and
a magnet supporting member for supporting the magnets.

16. The lens driving module of claim 15, wherein a material of the contact member of the stator and the contact member of the rotator is different from that of the coil supporting member and the magnet supporting member.

17. The lens driving module of claim 16, wherein the contact member of the stator and the coil supporting member are combined in a tight-fit manner.

18. The lens driving module of claim 8, wherein the coils and the magnets are spaced apart from each other along the optical axis.

19. The lens driving module of claim 8, wherein the coils and the magnets are spaced apart from each other in a direction perpendicular to the optical axis.

20. The lens driving module of claim 19,
wherein the rotator further comprises an inner insertion member extending in a direction parallel with the optical axis and inserted into an inner side of the stator, and
wherein the gap maintaining member comprises a movement limiting member between the inner insertion member and the stator.

* * * * *